United States Patent
Schillen et al.

(10) Patent No.: US 12,361,760 B2
(45) Date of Patent: Jul. 15, 2025

(54) OPTICAL SKIN DETECTION FOR FACE UNLOCK

(71) Applicant: trinamiX GmbH, Ludwigshafen am Rhein (DE)

(72) Inventors: Peter Schillen, Ludwigshafen am Rhein (DE); Benjamin Guthier, Ludwigshafen am Rhein (DE); Friedrich Schick, Ludwigshafen am Rhein (DE); Manuel Guenther, Zurich (CH); Lars Diesselberg, Karlsruhe (DE); Christian Lennartz, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/264,326

(22) PCT Filed: Feb. 17, 2022

(86) PCT No.: PCT/EP2022/053941
§ 371 (c)(1),
(2) Date: Aug. 4, 2023

(87) PCT Pub. No.: WO2022/175386
PCT Pub. Date: Aug. 25, 2022

(65) Prior Publication Data
US 2024/0037201 A1    Feb. 1, 2024

(30) Foreign Application Priority Data
Feb. 18, 2021   (EP) .................................... 21157800

(51) Int. Cl.
*G06V 40/40*   (2022.01)
*G01S 17/894*  (2020.01)
(Continued)

(52) U.S. Cl.
CPC ............ *G06V 40/40* (2022.01); *G01S 17/894* (2020.01); *G06F 21/32* (2013.01); *G06T 7/50* (2017.01);
(Continued)

(58) Field of Classification Search
CPC .... G06V 40/40; G06V 10/141; G06V 10/145; G06V 10/25; G06V 10/54; G06V 10/60;
(Continued)

(56) References Cited

U.S. PATENT DOCUMENTS

2019/0213309 A1   7/2019   Morestin et al.
2020/0082155 A1   3/2020   Kalscheur et al.
(Continued)

FOREIGN PATENT DOCUMENTS

CN    108573203 A    9/2018
CN    111164610 A    5/2020
(Continued)

OTHER PUBLICATIONS

Masi, et al. "Deep Face Recognition: A Survey" 2018 31st SIBGRAPI Conference on Graphics, Patterns and Images (SIBGRAPI), IEEE, pp. 471-478 (2018).
(Continued)

*Primary Examiner* — Phuoc Tran
(74) *Attorney, Agent, or Firm* — Armstrong Teasdale LLP

(57)   ABSTRACT

Disclosed herein is a method for face authentication. The method includes the following steps:
  a) at least one face detection step including determining at least one first image by using at least one camera;
  b) at least one skin detection step including projecting at least one illumination pattern including a plurality of illumination features on the scene by using at least one illumination unit, determining at least one second image using the at least one camera, and determining a first beam profile information;
(Continued)

c) at least one 3D detection step including determining a second beam profile information of at least four of the reflection features located inside the image region of the second image corresponding to the image region of the first image; and d) at least one authentication step including authenticating the detected face by using at least one authentication unit.

16 Claims, 2 Drawing Sheets

(51) Int. Cl.
G06F 21/32 (2013.01)
G06T 7/50 (2017.01)
G06V 10/141 (2022.01)
G06V 10/145 (2022.01)
G06V 10/25 (2022.01)
G06V 10/54 (2022.01)
G06V 10/60 (2022.01)
G06V 10/764 (2022.01)
G06V 10/82 (2022.01)
G06V 40/16 (2022.01)

(52) U.S. Cl.
CPC .......... G06V 10/141 (2022.01); G06V 10/145 (2022.01); G06V 10/25 (2022.01); G06V 10/54 (2022.01); G06V 10/60 (2022.01); G06V 10/764 (2022.01); G06V 10/82 (2022.01); G06V 40/165 (2022.01); G06V 40/168 (2022.01); G06V 40/172 (2022.01); G06T 2207/30201 (2013.01)

(58) Field of Classification Search
CPC .... G06V 10/764; G06V 10/82; G06V 40/165; G06V 40/168; G06V 40/172; G01S 17/894; G06F 21/32; G06T 7/50; G06T 2207/30201
See application file for complete search history.

(56) References Cited

U.S. PATENT DOCUMENTS

2021/0049391 A1* 2/2021 Zou ........................... G06T 7/62
2022/0222464 A1* 7/2022 Diedrich .............. G06V 40/166

FOREIGN PATENT DOCUMENTS

| WO | 2018091638 A1 | 5/2018 |
| WO | 2018091640 A2 | 5/2018 |
| WO | 2018091649 A1 | 5/2018 |
| WO | 2020187719 A1 | 9/2020 |
| WO | 2021152070 A1 | 8/2021 |
| WO | 2021170791 A1 | 9/2021 |
| WO | 2021214123 A1 | 10/2021 |

OTHER PUBLICATIONS

"Lasertechnik in der Medizin: Grundlagen, Systeme, Anwendungen", "Wirkung von Laserstrahlung auf Gewebe", 1991, pp. 10 171 to 266, Jürgen Eichler, Theo Seiler, Springer Verlag, ISBN 0939-0979, pp. 171-266 (1991).

Yu et al, "Face Anti-Spoofing with Human Material Perception", arXiv.org, Cornell University Library, 201 Olin Library Cornell University, Ithaca, NY 14853, 20 pages, (2020).

Yu et al., "Face Anti-Spoofing with Human Material Perception", Arxiv.org, Cornell University Library, 20 pages (2020).

International Search Report and Written Opinion for corresponding PCT/EP2022/053941, mailed Jun. 9, 2022, 12 pages.

* cited by examiner

OPTICAL SKIN DETECTION FOR FACE UNLOCK

CROSS-REFERENCE TO RELATED APPLICATIONS

This application is a U.S. National Phase Application of International Patent Application No. PCT/EP2022/053941, filed Feb. 17, 2022, which claims priority to EP Patent Application No. 21157800.0, filed Feb. 18, 2021, each of which is hereby incorporated by reference herein.

FIELD OF THE INVENTION

The invention relates to a method for face authentication, a mobile device and various uses of the method. The devices, methods and uses according to the present invention specifically may be employed for example in various areas of daily life, security technology, gaming, traffic technology, production technology, photography such as digital photography or video photography for arts, documentation or technical purposes, safety technology, information technology, agriculture, crop protection, maintenance, cosmetics, medical technology or in the sciences. However, other applications are also possible.

PRIOR ART

In today's digital world secure access to information technology is an essential requirement of any state-of-the-art system. Standard concepts like passphrases or PIN codes are currently extended, combined or even replaced by biometric methods like fingerprint or face recognition. Although passphrases can provide a high level of security if chosen carefully and at adequate length, this step requires attention and the need of memorizing several potentially long phrases depending on the IT landscape. Furthermore, it is never guaranteed that the person providing the passphrase is authorized by the owner of the passphrase or the digital device. In contrast biometric features like faces or fingerprints are unique and person-specific properties. Therefore, using features derived from these not only can be more convenient than passphrases/PIN codes but also more secure since they combine personal identity with an unlock process.

Unfortunately, similarly to being able to spy passwords, fingerprints and faces can be also artificially created in order to impersonate a legitimate user. Automatic face recognition tools of the first generation use digital camera images or image streams and apply 2D image processing methods to extract characteristic features, while machine learning techniques are used to generate face templates to perform identity recognition based on those features. The second generation of face recognition algorithms uses deep convolutional neuronal networks instead of handcrafted image features to generate the classification model.

However, both approaches can be attacked, e.g., with a high-quality photograph that is nowadays freely available to be downloaded from the Internet. Therefore, the idea of presentation attack detection (PAD) gained significance. Early approaches were designed to protect against simple attacks like presenting the photograph of a legitimate user by recording a sequence of images and test for time dependent features, for example small but natural changes in the head position or eye blinking. These methods can again be tricked by playing a pre-recorded video of the user or by careful animations generated from publicly available photographs. In order to exclude displays as potential spoof objects, near infra-red (NIR) cameras can be used, since displays emit photons only in the visible regime of the electromagnetic spectrum. As a further counteraction, 3D cameras were introduced, which can clearly distinguish between planar photos or tablets with playback videos and a 3D face. Still, these systems can be attacked with high quality masks generated, for example, by 3D printing, careful 3D-arrangement of 2D photos, or hand-crafted silicone or latex masks to name a few approaches. Since masks are typically worn by humans, liveness detection based on small motions fails as well. However, these types of masks can be rejected by a PAD system that is able to classify human skin from other materials such as described in EP application No. 20159984.2 filed on Feb. 28, 2020 and EP application No. 20 154 961.5190679 filed on Jan. 31, 2020, the full content of which is included by reference.

A further problem might arise from differences in skin optical properties with respect ethnic origin. A reliable recognition and PAD technology needs to be fully agnostic with respect to these different origins.

Besides security considerations, also the speed of the unlock process and the required computational power are important to provide an acceptable user experience. High-speed face recognition can be used for several tasks after the successful unlock of a device, for example to check whether the user is still in front of the display or to launch further secure applications like banking apps by performing an on the fly check of the person in front of the display. Again, speed and computational resources have great impact on the user experience.

Current 3D algorithms are computationally very demanding and presentation attack detections require several video frames to be processed. Therefore, expensive hardware needs to be involved to deliver acceptable unlock performance. Furthermore, high power consumption is a consequence.

Summarizing, current methods for face unlock do not provide the ability to reliably detect spoof attacks by 3D masks and perform this task at a speed below human detection limit.

US 2019/213309 A1 describes a system and method of authenticating a user's face with a ranging sensor. The ranging sensor includes a time of flight sensor and a reflectance sensor. The ranging sensor transmits a signal that is reflected off of a user and received back at the ranging sensor. The received signal can be used to determine distance between the user and the sensor, and the reflectance value of the user. With the distance or the reflectivity, a processor can activate a facial recognition process in response to the distance and the reflectivity.

Problem Addressed by the Invention

It is therefore an object of the present invention to provide devices and methods facing the above-mentioned technical challenges of known devices and methods. Although simple presentation attacks with photographs and videos of the legitimate face can be detected, an approach to reliably detect presentation attacks with 3D face masks is still missing. Specifically, another layer of security is needed to enable the replacement of passphrases/PIN codes by biometric features derived from faces to unlock digital devices. Moreover, a method is needed that operates fully agnostic with respect to different skin types originating from different ethnic origins.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a method for face authentication is disclosed. The face to be authenticated may be, specifically, a human face. The term "face authentication" as used herein is a broad term and is to be given its ordinary and customary meaning to a person of ordinary skill in the art and is not to be limited to a special or customized meaning. The term specifically may refer, without limitation, to verifying a recognized object or part of the recognized object as human face. Specifically, the authentication may comprise distinguishing a real human face from attack materials that were produced to mimic a face. The authentication may comprise verifying identity of a respective user and/or assigning identity to a user. The authentication may comprise generating and/or providing identity information, e.g. to other devices such as to at least one authorization device for authorization for access of a mobile device, a machine, an automobile, a building or the like. The identify information may be proofed by the authentication. For example, the identity information may be and/or may comprise at least one identity token. In case of successful authentication the recognized object or part of the recognized object is verified to be a real face and/or the identity of the object, in particular a user, is verified.

The method comprises the following steps:
a) at least one face detection step, wherein the face detection step comprises determining at least one first image by using at least one camera, wherein the first image comprises at least one two-dimensional image of a scene suspected to comprise the face, wherein the face detection step comprises detecting the face in the first image by identifying in the first image at least one pre-defined or pre-determined geometrical feature characteristic for faces by using at least one processing unit;
b) at least one skin detection step, wherein the skin detection step comprises projecting at least one illumination pattern comprising a plurality of illumination features on the scene by using at least one illumination unit and determining at least one second image using the at least one camera, wherein the second image comprises a plurality of reflection features generated by the scene in response to illumination by the illumination features, wherein each of the reflection features comprises at least one beam profile, wherein the skin detection step comprises determining a first beam profile information of at least one of the reflection features located inside an image region of the second image corresponding to an image region of the first image comprising the identified geometrical feature by analysis of its beam profile and determining at least one material property of the reflection feature from the first beam profile information by using the processing unit, wherein the detected face is characterized as skin if the material property corresponds to at least one property characteristic for skin;
c) at least one 3D detection step, wherein the 3D detection step comprises determining a second beam profile information of at least four of the reflection features located inside the image region of the second image corresponding to the image region of the first image comprising the identified geometrical feature by analysis of their beam profiles and determining at least one depth level from the second beam profile information of said reflection features by using the processing unit, wherein the detected face is characterized as 3D object if the depth level deviates from a pre-determined or pre-defined depth level of plane objects;
d) at least one authentication step, wherein the authentication step comprises authenticating the detected face by using at least one authentication unit if in step b) the detected face is characterized as skin and in step c) the detected face is characterized as 3D object.

The method steps may be performed in the given order or may be performed in a different order. Further, one or more additional method steps may be present which are not listed. Further, one, more than one or even all of the method steps may be performed repeatedly.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. The camera may be a digital camera. As an example, the camera may comprise at least one camera chip, such as at least one CCD chip and/or at least one CMOS chip configured for recording images. The camera may be or may comprise at least one near infrared camera.

As used herein, without limitation, the term "image" specifically may relate to data recorded by using a camera, such as a plurality of electronic readings from the imaging device, such as the pixels of the camera chip. The camera, besides the at least one camera chip or imaging chip, may comprise further elements, such as one or more optical elements, e.g. one or more lenses. As an example, the camera may be a fix-focus camera, having at least one lens which is fixedly adjusted with respect to the camera. Alternatively, however, the camera may also comprise one or more variable lenses which may be adjusted, automatically or manually.

The camera may be a camera of a mobile device such as of notebook computers, tablets or, specifically, cell phones such as smart phones and the like. Thus, specifically, the camera may be part of a mobile device which, besides the at least one camera, comprises one or more data processing devices such as one or more data processors. Other cameras, however, are feasible. The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smart phone. Additionally or alternatively, the mobile device may also refer to a tablet computer or another type of portable computer.

Specifically, the camera may be or may comprise at least one optical sensor having at least one light-sensitive area. As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination at least one sensor signal is generated. The light-sensitive area may specifically be located on a surface of the respective optical sensor. Other embodiments, however, are feasible. The camera may comprise a plurality of optical sensors each having a light sensitive area. As used herein, the term "the optical sensors each having at least one light sensitive area" refers to configurations with a plurality of single optical sensors each having one light sensitive area and to configurations with one combined optical sensor having a plurality of light sensitive areas. The term "optical sensor" furthermore refers to a light-sensitive device configured to generate one output signal. In case the camera comprises a plurality of optical sensors, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the camera specifically simple and efficient. Thus, as an example, commercially available photosensors, such as commercially available silicon photodiodes, each having precisely one sensitive area, may be used in the set-up. Other embodiments, however, are feasible.

The optical sensor specifically may be or may comprise at least one photodetector, preferably inorganic photodetectors, more preferably inorganic semiconductor photodetectors, most preferably silicon photodetectors. Specifically, the optical sensor may be sensitive in the infrared spectral range.

The optical sensor may comprise at least one sensor element comprising a matrix of pixels. All pixels of the matrix or at least a group of the optical sensors of the matrix specifically may be identical. Groups of identical pixels of the matrix specifically may be provided for different spectral ranges, or all pixels may be identical in terms of spectral sensitivity. Further, the pixels may be identical in size and/or with regard to their electronic or optoelectronic properties. Specifically, the optical sensor may be or may comprise at least one array of inorganic photodiodes which are sensitive in the infrared spectral range, preferably in the range of 700 nm to 3.0 micrometers. Specifically, the optical sensor may be sensitive in the part of the near infrared region where silicon photodiodes are applicable specifically in the range of 700 nm to 1100 nm. Infrared optical sensors which may be used for optical sensors may be commercially available infrared optical sensors, such as infrared optical sensors commercially available under the brand name Hertzstueck™ from trinamiX™ GmbH, D-67056 Ludwigshafen am Rhein, Germany. Thus, as an example, the optical sensor may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensor may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensor may comprise at least one photoconductive sensor such as a PbS or PbSe sensor, a bolometer, preferably a bolometer selected from the group consisting of a VO bolometer and an amorphous Si bolometer.

The optical sensor may be sensitive in one or more of the ultraviolet, the visible or the infrared spectral range. Specifically, the optical sensor may be sensitive in the visible spectral range from 500 nm to 780 nm, most preferably at 650 nm to 750 nm or at 690 nm to 700 nm. Specifically, the optical sensor may be sensitive in the near infrared region. Specifically, the optical sensor may be sensitive in the part of the near infrared region where silicon photodiodes are applicable specifically in the range of 700 nm to 1000 nm. The optical sensor, specifically, may be sensitive in the infrared spectral range, specifically in the range of 780 nm to 3.0 micrometers. For example, the optical sensor each, independently, may be or may comprise at least one element selected from the group consisting of a photodiode, a photocell, a photoconductor, a phototransistor or any combination thereof. For example, the optical sensor may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

The optical sensor may comprise at least one sensor element comprising a matrix of pixels. Thus, as an example, the optical sensor may be part of or constitute a pixelated optical device. For example, the optical sensor may be and/or may comprise at least one CCD and/or CMOS device. As an example, the optical sensor may be part of or constitute at least one CCD and/or CMOS device having a matrix of pixels, each pixel forming a light-sensitive area.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. The sensor element comprises a matrix of optical sensors. The sensor element may comprise at least one CMOS sensor. The matrix may be composed of independent pixels such as of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the sensor element may be and/or may comprise at least one CCD and/or CMOS device and/or the optical sensors may form a sensor array or may be part of a sensor array, such as the above-mentioned matrix. Thus, as an example, the sensor element may comprise an array of pixels, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix may be composed of independent pixels such as of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the optical sensor may be and/or may comprise at least one CCD and/or CMOS device and/or the optical sensors of the camera form a sensor array or may be part of a sensor array, such as the above-mentioned matrix.

The matrix specifically may be a rectangular matrix having at least one row, preferably a plurality of rows, and a plurality of columns. As an example, the rows and columns may be oriented essentially perpendicular. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Thus, as an example, tolerances of less than 20°, specifically less than 10° or even less than 5°, may be acceptable. In order to provide a wide range of view, the matrix specifically may have at least 10 rows, preferably at least 500 rows, more preferably at least 1000 rows. Similarly, the matrix may have at least 10 columns, preferably at least 500 columns, more preferably at least 1000 columns. The matrix may comprise at least 50 optical sensors, preferably at least 100000 optical sensors, more preferably at least 5000000 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Thus, as an example, the sensor element may be part of or constitute a pixelated optical device. For example, the sensor element may be and/or may comprise at least one CCD and/or CMOS device. As an example, the sensor element may be part of or constitute at least one CCD and/or CMOS device having a matrix of pixels, each pixel forming a light-sensitive area. The sensor element may employ a rolling shutter or global shutter method to read out the matrix of optical sensors.

The camera further may comprise at least one transfer device. The camera may further comprise one or more additional elements such as one or more additional optical elements. The camera may comprise at least one optical element selected from the group consisting of: transfer device, such as at least one lens and/or at least one lens system, at least one diffractive optical element. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensor. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may have a focal length. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. As used herein, the term "optical axis of the transfer device" generally refers to an axis of mirror symmetry or rotational symmetry of the lens or lens system. The transfer system, as an example, may comprise at least one beam path, with the elements of the transfer system in the beam path being located in a rotationally symmetrical fashion with respect to the optical axis. Still, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the camera may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. In case of a plurality of optical sensors, the optical sensors may be located in one and the same beam path or partial beam path. Alternatively, however, the optical sensors may also be located in different partial beam paths.

The transfer device may constitute a coordinate system, wherein a longitudinal coordinate is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The camera is configured for determining at least one image of the scene, in particular the first image. As used herein, the term "scene" may refer to a spatial region. The scene may comprise the face under authentication and a surrounding environment. The first image itself may comprise pixels, the pixels of the image correlating to pixels of the matrix of the sensor element. Consequently, when referring to "pixels", reference is either made to the units of image information generated by the single pixels of the sensor element or to the single pixels of the sensor element directly. The first image is at least one two-dimensional image. As used herein, the term "two dimensional image" may generally refer to an image having information about transversal coordinates such as the dimensions of height and width. The first image may be an RGB (red green blue) image. The term "determining at least one first image" may refer to capturing and/or recording the first image.

The face detection step comprises detecting the face in the first image by identifying in the first image the at least one pre-defined or pre-determined geometrical feature characteristic for faces by using the at least one processing unit. Specifically, the face detection step comprises detecting the face in the first image by identifying in the first image at least one pre-defined or pre-determined geometrical feature which is characteristic for faces by using the at least one processing unit.

As further used herein, the term "processing unit" generally refers to an arbitrary data processing device adapted to perform the named operations such as by using at least one processor and/or at least one application-specific integrated circuit. Thus, as an example, the at least one processing unit may comprise a software code stored thereon comprising a number of computer commands. The processing unit may provide one or more hardware elements for performing one or more of the named operations and/or may provide one or more processors with software running thereon for performing one or more of the named operations. Operations, including evaluating the images may be performed by the at least one processing unit. Thus, as an example, one or more instructions may be implemented in software and/or hardware. Thus, as an example, the processing unit may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the processing unit may also fully or partially be embodied by hardware. The processing unit and the camera may fully or partially be integrated into a single device. Thus, generally, the processing unit also may form part of the camera. Alternatively, the processing unit and the camera may fully or partially be embodied as separate devices.

The processing unit may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the processing unit may comprise one or more measurement devices, such as one or more measurement devices for measuring electrical currents and/or electrical voltages. Further, the processing unit may comprise one or more data storage devices. Further, the processing unit may comprise one or more interfaces, such as one or more wireless interfaces and/or one or more wire-bound interfaces.

The processing unit may be configured to one or more of displaying, visualizing, analyzing, distributing, communicating or further processing of information, such as information obtained by the camera. The processing unit, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an 25 Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AM BA buses or be integrated in an Internet of Things or Industry 4.0 type network.

The processing unit may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as CameraLink. The processing unit may further be connected by one or more of interprocessor interfaces or ports, FPGA-FPGA-interfaces, or serial or parallel interfaces ports. The processing unit may further be connected to one or more of an optical disc drive, a CD-RW drive, a DVD+RW drive, a flash drive, a memory card, a disk drive, a hard disk drive, a solid state disk or a solid state hard disk.

The processing unit may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

The detecting of the face in the first image may comprise identifying the at least one pre-defined or pre-determined geometrical feature characteristic for faces. The term "geometrical feature characteristic for faces" as used herein is a broad term and is to be given its ordinary and customary meaning to a person of ordinary skill in the art and is not to be limited to a special or customized meaning. The term specifically may refer, without limitation, to at least one geometry-based feature which describe the shape of the face and its components, in particular one or more of nose, eyes, mouth or eyebrow and the like. The processing unit may comprise at least one database wherein the geometrical feature characteristic for faces are stored such as in a lookup table. Techniques for identifying the at least one pre-defined or pre-determined geometrical feature characteristic for faces are generally known to the skilled person. For example, the face detection may be performed as described in Masi, Lacopo, et al. "Deep face recognition: A survey" 2018 31st SIBGRAPI conference on graphics, patterns and images (SIBGRAPI), IEEE, 2018, the full content of which is included by reference.

The processing unit may be configured for performing at least one image analysis and/or image processing in order to identify the geometrical feature. The image analysis and/or image processing may use at least one feature detection algorithm. The image analysis and/or image processing may comprise one or more of the following: a filtering; a selection of at least one region of interest; a background correction; a decomposition into color channels; a decomposition into hue, saturation, and/or brightness channels; a frequency decomposition; a singular value decomposition; applying a blob detector; applying a corner detector; applying a Determinant of Hessian filter; applying a principle curvature-based region detector; applying a gradient location and orientation histogram algorithm; applying a histogram of oriented gradients descriptor; applying an edge detector; applying a differential edge detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing a feature within the first image.

Specifically subsequent to the face detection step, the skin detection step may be performed comprising projecting at least one illumination pattern comprising a plurality of illumination features on the scene by using the at least one illumination unit. However, embodiments are feasible wherein the skin detection step is performed before the face detection step.

As used herein, the term "illumination unit", also denoted as illumination source, may generally refers to at least one arbitrary device configured for generating at least one illumination pattern. The illumination unit may be configured for providing the illumination pattern for illumination of the scene. The illumination unit may be adapted to directly or indirectly illuminating the scene, wherein the illumination pattern is remitted, in particular reflected or scattered, by surfaces of the scene and, thereby, is at least partially directed towards the camera. The illumination unit may be configured for illuminating the scene, for example, by directing a light beam towards the scene, which reflects the light beam. The illumination unit may be configured for generating an illuminating light beam for illuminating the scene.

The illumination unit may comprise at least one light source. The illumination unit may comprise a plurality of light sources. The illumination unit may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination unit may have a wavelength of 300 to 1100 nm, especially 500 to 1100 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1100 nm may be used.

The illumination unit may be configured for generating the at least one illumination pattern in the infrared region. The illumination features may have wavelengths in a near infrared (NIR) regime. The illumination features may have wavelengths of about 940 nm. At this wavelength Melanin absorption runs out so that dark and light complecion reflect light almost identical. However, other wavelength in the NIR region may be possible such as one or more of 805 nm, 830 nm, 835 nm, 850 nm, 905 nm, or 980 nm. Moreover, using light in the near infrared region allows that light is not or only weakly detected by human eyes and is still detectable by silicon sensors, in particular standard silicon sensors.

The illumination unit may be configured for emitting light at a single wavelength. In other embodiments, the illumination unit may be configured for emitting light with a plurality of wavelengths allowing additional measurements in other wavelengths channels.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however.

The illumination unit may be or may comprise at least one multiple beam light source. For example, the illumination unit may comprise at least one laser source and one or more diffractive optical elements (DOEs). Specifically, the illumination unit may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs and/or light bulbs. The illumination unit may comprise one or more diffractive optical elements (DOEs) adapted to generate the illumination pattern. For example, the illumination unit may be adapted to generate and/or to project a cloud of points, for example the illumination unit may comprise one or more of at least one digital light processing projector, at least one LCoS projector, at least one spatial light modulator; at least one diffractive optical element; at least one array of light emitting diodes; at least one array of laser light sources. On account of their generally defined beam profiles and other properties of handleability, the use of at least one laser source as the illumination unit is particularly preferred. The illumination unit may be integrated into a housing of the camera or may be separated from the camera.

Further, the illumination unit may be configured for emitting modulated or non-modulated light. In case a plurality of illumination units is used, the different illumination units may have different modulation frequencies which later on may be used for distinguishing the light beams.

The light beam or light beams generated by the illumination unit generally may propagate parallel to the optical axis or tilted with respect to the optical axis, e.g. including an angle with the optical axis. The illumination unit may be configured such that the light beam or light beams propagates from the illumination unit towards the scene along an optical axis of the illumination unit and/or of the camera. For this purpose, the illumination unit and/or the camera may comprise at least one reflective element, preferably at least one prism, for deflecting the illuminating light beam onto the optical axis. As an example, the light beam or light beams, such as the laser light beam, and the optical axis may include an angle of less than 10°, preferably less than 5° or even less than 2°. Other embodiments, however, are feasible. Further, the light beam or light beams may be on the optical axis or off the optical axis. As an example, the light beam or light beams may be parallel to the optical axis having a distance of less 10 than 10 mm to the optical axis, preferably less than 5 mm to the optical axis or even less than 1 mm to the optical axis or may even coincide with the optical axis.

As used herein, the term "at least one illumination pattern" refers to at least one arbitrary pattern comprising at least one illumination feature adapted to illuminate at least one part of the scene. As used herein, the term "illumination feature" refers to at least one at least partially extended feature of the pattern. The illumination pattern may comprise a single illumination feature. The illumination pattern may comprise a plurality of illumination features. The illumination pattern may be selected from the group consisting of: at least one point pattern; at least one line pattern; at least one stripe pattern; at least one checkerboard pattern; at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the illumination unit may be adapted to generate and/or to project a cloud of points. The illumination unit may comprise the at least one light projector adapted to generate a cloud of points such that the illumination pattern may comprise a plurality of point pattern. The illumination pattern may comprise a periodic grid of laser spots. The illumination unit may comprise at least one mask adapted to generate the illumination pattern from at least one light beam generated by the illumination unit.

A distance between two features of the illumination pattern and/or an area of the at least one illumination feature may depend on the circle of confusion in the image. As outlined above, the illumination unit may comprise the at least one light source configured for generating the at least one illumination pattern. Specifically, the illumination unit comprises at least one laser source and/or at least one laser diode which is designated for generating laser radiation. The illumination unit may comprise the at least one diffractive optical element (DOE). The illumination unit may comprise at least one point projector, such as the at least one laser source and the DOE, adapted to project at least one periodic point pattern. As further used herein, the term "projecting at least one illumination pattern" may refer to providing the at least one illumination pattern for illuminating the at least one scene.

The skin detection step comprises determining the at least one second image, also denoted as reflection image, using the camera. The method may comprise determining plurality of second images. The reflection features of the plurality of second images may be used for skin detection in step b) and/or for 3D detection in step c).

The second image comprises a plurality of reflection features generated by the scene in response to illumination by the illumination features. As used herein, the term "reflection feature" may refer to a feature in an image plane generated by the scene in response to illumination, specifically with at least one illumination feature. Each of the reflection features comprises at least one beam profile, also denoted reflection beam profile. As used herein, the term "beam profile" of the reflection feature may generally refer to at least one intensity distribution of the reflection feature, such as of a light spot on the optical sensor, as a function of the pixel. The beam profile may be selected from the group consisting of a trapezoid beam profile; a triangle beam profile; a conical beam profile and a linear combination of Gaussian beam profiles.

The evaluation of the second image may comprise identifying the reflection features of the second image. The processing unit may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing a feature within the image generated by the optical sensor.

For example, the illumination unit may be configured for generating and/or projecting a cloud of points such that a plurality of illuminated regions is generated on the optical sensor, for example the CMOS detector. Additionally, disturbances may be present on the optical sensor such as disturbances due to speckles and/or extraneous light and/or multiple reflections. The processing unit may be adapted to determine at least one region of interest, for example one or more pixels illuminated by the light beam which are used for determination of the longitudinal coordinate for the respective reflection feature, which will be described in more detail below. For example, the processing unit may be adapted to perform a filtering method, for example, a blob-analysis and/or an edge filter and/or object recognition method.

The processing unit may be configured for performing at least one image correction. The image correction may comprise at least one background subtraction. The processing unit may be adapted to remove influences from background light from the beam profile, for example, by an imaging without further illumination.

The processing unit may be configured for determining the beam profile of the respective reflection feature. As used herein, the term "determining the beam profile" refers to identifying at least one reflection feature provided by the optical sensor and/or selecting at least one reflection feature provided by the optical sensor and evaluating at least one intensity distribution of the reflection feature. As an example, a region of the matrix may be used and evaluated for determining the intensity distribution, such as a three-dimensional intensity distribution or a two-dimensional intensity distribution, such as along an axis or line through the matrix. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The reflection feature may cover or may extend over at least one pixel of the second image. For example, the reflection feature may cover or may extend over plurality of pixels. The processing unit may be configured for determining and/or for selecting all pixels connected to and/or belonging to the reflection feature, e.g. a light spot. The processing unit may be configured for determining the center of intensity by $$R_{coi} = \frac{1}{l \cdot \sum_j j \cdot r_{pixel}},$$

wherein $R_{coi}$ is a position of center of intensity, $r_{pixel}$ is the pixel position and $l=\Sigma_j I_{total}$ with j being the number of pixels j connected to and/or belonging to the reflection feature and $I_{total}$ being the total intensity.

The processing unit is configured for determining a first beam profile information of at least one of the reflection features located inside an image region of the second image corresponding to an image region of the first image comprising the identified geometrical feature by analysis of its beam profile. The method may comprise identifying the image region of the second image corresponding to the image region of the first image comprising the identified geometrical feature. Specifically, the method may comprise matching pixels of the first image and the second image and selecting the pixels of the second image corresponding to the image region of the first image comprising the identified geometrical feature. The method may comprise considering in addition further reflection features located outside said image region of the second image.

As used herein, the term "beam profile information" may refer to arbitrary information and/or property derived from and/or relating to the beam profile of the reflection feature. The first and the second beam profile information may be identical or may be different. For example, the first beam profile information may be an intensity distribution, a reflection profile, a center of intensity, a material feature. For skin detection in step b), beam profile analysis may be used. Specifically, beam profile analysis makes use of reflection properties of coherent light projected onto object surfaces to classify materials. The classification of materials may be performed as described in WO 2020/187719, in EP application 20159984.2 filed on Feb. 28, 2020 and/or EP application 20 154 961.5 filed on Jan. 31, 2020, the full content of which is included by reference. Specifically, a periodic grid of laser spots, e.g. a hexagonal grid as described in EP application 20 170 905.2 filed on Apr. 22, 2020, is projected and the reflection image is recorded with the camera. Analyzing the beam profile of each reflection feature recorded by the camera may be performed by feature-based methods. The feature-based methods may be explained in the following. The feature based methods may be used in combination with machine learning methods which may allow parametrization of a skin classification model. Alternatively or in combination, convolutional neuronal networks may be utilized to classify skin by using the reflection images as an input.

Other methods for authenticating a user's face are known, such as from US 2019/213309 A1. However, these methods use time of flight (ToF) sensors. A well-known working principle of a ToF sensor is sending out light and measuring the time span until receiving the reflected light. In contrast, the proposed beam profile analysis uses a projected illumination pattern. For ToF sensor using such a projected pattern is not possible. Using illumination pattern may be advantageous e.g. in view of covering and therefore allowing to take into account different locations on the face. This may enhance reliability and security of the authentication of the user's face.

The skin detection step may comprise determining at least one material property of the reflection feature from the beam profile information by using the processing unit. Specifically, the processing unit is configured for identifying a reflection feature as to be generated by illuminating biological tissue, in particular human skin, in case its reflection beam profile fulfills at least one predetermined or predefined criterion. As used herein, the term "at least one predetermined or predefined criterion" refers to at least one property and/or value suitable to distinguish biological tissue, in particular human skin, from other materials. The predetermined or predefined criterion may be or may comprise at least one predetermined or predefined value and/or threshold and/or threshold range referring to a material property. The reflection feature may be indicated as to be generated by biological tissue in case the reflection beam profile fulfills the at least one predetermined or predefined criterion. As used herein, the term "indicate" refers to an arbitrary indication such as an electronic signal and/or at least one visual or acoustic indication. The processing unit is configured for identifying the reflection feature as to be non-skin otherwise. As used herein, the term "biological tissue" generally refers to biological material comprising living cells. Specifically, the processing unit may be configured for skin detection. The term "identification" of being generated by biological tissue, in particular human skin, may refer to determining and/or validating whether a surface to be examined or under test is or comprises biological tissue, in particular human skin, and/or to distinguish biological tissue, in particular human skin, from other tissues, in particular other surfaces. The method according to the present invention may allow for distinguishing human skin from one or more of inorganic tissue, metal surfaces, plastics surfaces, foam, paper, wood, a display, a screen, cloth. The method according to the present invention may allow for distinguishing human biological tissue from surfaces of artificial or non-living objects.

The processing unit may be configured for determining the material property m of the surface remitting the reflection feature by evaluating the beam profile of the reflection feature. As used herein, the term "material property" refers to at least one arbitrary property of the material configured for characterizing and/or identification and/or classification of the material. For example, the material property may be a property selected from the group consisting of: roughness, penetration depth of light into the material, a property characterizing the material as biological or nonbiological material, a reflectivity, a specular reflectivity, a diffuse reflectivity, a surface property, a measure for translucence, a scattering, specifically a back-scattering behavior or the like. The at least one material property may be a property selected from the group consisting of: a scattering coefficient, a translucency, a transparency, a deviation from a Lambertian surface reflection, a speckle, and the like. As used herein, the term "determining at least one material property" may refer to assigning the material property to respective reflection feature, in particular to the detected face. The processing unit may comprise at least one database comprising a list and/or table, such as a lookup list or a lookup table, of predefined and/or predetermined material properties. The list and/or table of material properties may be determined and/or generated by performing at least one test measurement, for example by performing material tests using samples having known material properties. The list and/or table of material properties may be determined and/or generated at the manufacturer site and/or by a user. The material property may additionally be assigned to a material classifier such as one or more of a material name, a material group such as biological or non-biological material, translucent or non-translucent materials, metal or non-metal, skin or non-skin, fur or non-fur, carpet or non-carpet, reflective or nonreflective, specular reflective or non-specular reflective, foam or non-foam, hair or non-hair, roughness groups or the like. The processing unit may comprise at least one database comprising a list and/or table comprising the material properties and associated material name and/or material group.

The reflection properties of skin may be characterized by the simultaneous occurrence of direct reflection at the surface (Lambertian-like) and subsurface scattering (volume scattering). This leads to a broadening of the laser spot on skin compared to the above-mentioned materials.

The first beam profile information may be a reflection profile. For example, without wishing to be bound by this theory, human skin may have a reflection profile, also denoted back scattering profile, comprising parts generated by back reflection of the surface, denoted as surface reflection, and parts generated by very diffuse reflection from light penetrating the skin, denoted as diffuse part of the back reflection. With respect to reflection profile of human skin reference is made to "Lasertechnik in der Medizin: Grundlagen, Systeme, Anwendungen", "Wirkung von Laserstrahlung auf Gewebe", 1991, pages 10 171 to 266, Jürgen Eichler, Theo Seiler, Springer Verlag, ISBN 0939-0979. The surface reflection of the skin may increase with the wavelength increasing towards the near infrared. Further, the penetration depth may increase with increasing wavelength from visible to near infrared. The diffuse part of the back reflection may increase with penetrating depth of the light. These properties may be used to distinguish skin from other materials, by analyzing the back scattering profile.

Specifically, the processing unit may be configured for comparing the reflection beam profile with at least one predetermined and/or prerecorded and/or predefined beam profile. The predetermined and/or prerecorded and/or predefined beam profile may be stored in a table or a lookup table and may be determined e.g. empirically, and may, as an example, be stored in at least one data storage device of the detector. For example, the predetermined and/or prerecorded and/or predefined beam profile may be determined during initial start-up of a device executing the method according to the present invention. For example, the predetermined and/or prerecorded and/or predefined beam profile may be stored in at least one data storage device of the processing unit or the device, e.g. by software, specifically by the app downloaded from an app store or the like. The reflection feature may be identified as to be generated by biological tissue in case the reflection beam profile and the predetermined and/or prerecorded and/or predefined beam profile are identical. The comparison may comprise overlaying the reflection beam profile and the predetermined or predefined beam profile such that their centers of intensity match. The comparison may comprise determining a deviation, e.g. a sum of squared point to point distances, between the reflection beam profile and the predetermined and/or prerecorded and/or predefined beam profile. The processing unit may be adapted to compare the determined deviation with at least one threshold, wherein in case the determined deviation is below and/or equal the threshold the surface is indicated as biological tissue and/or the detection of biological tissue is confirmed. The threshold value may be stored in a table or a lookup table and may be determined e.g. empirically and may, as an example, be stored in at least one data storage device of the processing unit.

Additionally or alternatively, the first beam profile information may be determined by applying at least one image filter to the image of the area. As further used herein, the term "image" refers to a two-dimensional function, f(x,y), wherein brightness and/or color values are given for any x,y-position in the image. The position may be discretized corresponding to the recording pixels. The brightness and/or color may be discretized corresponding to a bit-depth of the optical sensors. As used herein, the term "image filter" refers to at least one mathematical operation applied to the beam profile and/or to the at least one specific region of the beam profile. Specifically, the image filter $\Phi$ maps an image f, or a region of interest in the image, onto a real number, $\Phi(f(x,y))=\varphi$, wherein $\varphi$ denotes a feature, in particular a material feature. Images may be subject to noise and the same holds true for features. Therefore, features may be random variables. The features may be normally distributed. If features are not normally distributed, they may be transformed to be normally distributed such as by a Box-Cox-Transformation.

The processing unit may be configured for determining at least one material feature $\varphi_{2m}$ by applying at least one material dependent image filter $\Phi_2$ to the image. As used herein, the term "material dependent" image filter refers to an image having a material dependent output. The output of the material dependent image filter is denoted herein "material feature $\varphi_{2m}$" or "material dependent feature $\varphi_{2m}$". The material feature may be or may comprise at least one information about the at least one material property of the surface of the scene having generated the reflection feature.

The material dependent image filter may be at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\Phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\Phi_{2other},\Phi_m}|\geq 0.40$ with $\Phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof. The further material dependent image filter $\Phi_{2other}$ may correlate to one or more of the material dependent image filters $\Phi_m$ by $|\rho_{\Phi_{2other},\Phi_m}|\geq 0.60$, preferably by $|\rho_{\Phi_{2other},\Phi_m}|\geq 0.80$.

The material dependent image filter may be at least one arbitrary filter $\Phi$ that passes a hypothesis testing. As used herein, the term "passes a hypothesis testing" refers to the fact that a Null-hypothesis $H_0$ is rejected and an alternative hypothesis $H_1$ is accepted. The hypothesis testing may comprise testing the material dependency of the image filter by applying the image filter to a predefined data set. The data set may comprise a plurality of beam profile images. As used herein, the term "beam profile image" refers to a sum of $N_B$ Gaussian radial basis functions, $$f_k(x,y)=|\Sigma_{l=0}^{N_B-1} g_{lk}(x,y)|,$$

$$g_{lk}(x,y)=a_{lk}e^{-(\alpha(x-x_{lk}))^2}e^{-(\alpha(y-y_{lk}))^2}$$

wherein each of the $N_B$ Gaussian radial basis functions is defined by a center $(x_{lk}, y_{lk})$, a prefactor, $a_{lk}$, and an exponential factor $\alpha=1/\epsilon$. The exponential factor is identical for all Gaussian functions in all images. The center-positions, $x_{lk}, y_{lk}$, are identical for all images $f_k$: $(x_0, x_1, \ldots, x_{N_{B-1}}), (y_0, y_1, \ldots, y_{N_{B-1}})$. Each of the beam profile images in the dataset may correspond to a material classifier and a distance. The material classifier may be a label such as 'Material A', 'Material B', etc. The beam profile images may be generated by using the above formula for $f_k(x, y)$ in combination with the following parameter table:

| Image Index | Material classifier, Material Index | Distance Z | Parameters |
|---|---|---|---|
| k = 0 | Skin, m = 0 | 0.4 m | $(a_{00}, a_{10}, \cdots, a_{N_B-10})$ |
| k = 1 | Skin, m = 0 | 0.6 m | $(a_{01}, a_{11}, \cdots, a_{N_B-11})$ |
| k = 2 | Fabric, m = 1 | 0.6 m | $(a_{02}, a_{12}, \cdots, a_{N_B-12})$ |
| ... | ... | ... | ... |
| k = N | Material J, m = J − 1 | | $(a_{0N}, a_{1N}, \cdots, a_{N_B-1N})$ |

The values for x, y, are integers corresponding to pixels with $$\binom{x}{y} \in [0, 1, \ldots 31]^2.$$

The images may have a pixel size of 32×32. The dataset of beam profile images may be generated by using the above formula for $f_k$ in combination with a parameter set to obtain a continuous description of $f_k$. The values for each pixel in the 32×32-image may be obtained by inserting integer values from 0, . . . , 31 for x, y, in $f_k(x, y)$. For example, for pixel (6,9), the value $f_k(6,9)$ may be computed.

Subsequently, for each image $f_k$, the feature value $\varphi_k$ corresponding to the filter $\Phi$ may be calculated, $\Phi(f_k(x,y), z_k)=\varphi_k$, wherein $z_k$ is a distance value corresponding to the image $f_k$ from the predefined data set. This yields a dataset with corresponding generated feature values $\varphi_k$. The hypothesis testing may use a Null-hypothesis that the filter does not distinguish between material classifier. The Null-Hypothesis may be given by $H_0:\mu_1=\mu_2=\ldots=\mu_J$, wherein $\mu_m$ is the expectation value of each material-group corresponding to the feature values $\varphi_k$. Index m denotes the material group. The hypothesis testing may use as alternative hypothesis that the filter does distinguish between at least two material classifiers. The alternative hypothesis may be given by $H_1$: $\exists m, m':\mu_m \neq \mu_{m'}$. As used herein, the term "not distinguish between material classifiers" refers to that the expectation values of the material classifiers are identical. As used herein, the term "distinguishes material classifiers" refers to that at least two expectation values of the material classifiers differ. As used herein "distinguishes at least two material classifiers" is used synonymous to "suitable material classifier". The hypothesis testing may comprise at least one analysis of variance (ANOVA) on the generated feature values. In particular, the hypothesis testing may comprise determining a mean-value of the feature values for each of the J materials, i.e. in total J mean values, $$\overline{\varphi}_m = \frac{\sum_i \varphi_{i,m}}{N_m},$$

for $m \in [0, 1, \ldots, J-1]$, wherein $N_m$ gives the number of feature values for each of the J materials in the predefined data set. The hypothesis testing may comprise determining a mean-value of all N feature values $$\overline{\varphi} = \frac{\sum_m \sum_i \varphi_{i,m}}{N}.$$

The hypothesis testing may comprise determining a Mean Sum Squares within:

mssw=$(\Sigma_m \Sigma_i (\varphi_{i,m} - \overline{\varphi}_m)^2)/(N-J)$.

The hypothesis testing may comprise determining a Mean Sum of Squares between, mssb=$(\Sigma_m (\overline{\varphi}_m - \overline{\varphi})^2 N_m)/(J-1)$.

The hypothesis testing may comprise performing an F-Test:

$$CDF(x) = I_{\frac{d_1 x}{d_1 x + d_2}}\left(\frac{d_1}{2}, \frac{d_2}{2}\right), \text{ where } d_1 = N - J, d_2 = J - 1,$$

$$F(x) = 1 - CDF(x)$$

$$p = F(mssb/mssw)$$

Herein, $I_x$ is the regularized incomplete Beta-Function, $$I_x(a, b) = \frac{B(x; a, b)}{B(a, b)},$$

with the Euler Beta-Function $B(a, b)=\int_0^1 t^{a-1}(1-t)^{b-1}dt$ and $B(x; a, b)=\int_0^x t^{a-1}(1-t)^{b-1}dt$ being the incomplete Beta-Function. The image filter may pass the hypothesis testing if a p-value, p, is smaller or equal than a pre-defined level of significance. The filter may pass the hypothesis testing if $p \leq 0.075$, preferably $p \leq 0.05$, more preferably $p \leq 0.025$, and most preferably $p \leq 0.01$. For example, in case the pre-defined level of significance is $\alpha=0.075$, the image filter may pass the hypothesis testing if the p-value is smaller than $\alpha=0.075$. In this case the Null-hypothesis $H_0$ can be rejected and the alternative hypothesis $H_1$ can be accepted. The image filter thus distinguishes at least two material classifiers. Thus, the image filter passes the hypothesis testing.

In the following, image filters are described assuming that the reflection image comprises at least one reflection feature, in particular a spot image. A spot image f may be given by a function f: $\mathbb{R}^2 \to \mathbb{R}_{\geq 0}$, wherein the background of the image f may be already subtracted. However, other reflection features may be possible.

For example, the material dependent image filter may be a luminance filter. The luminance filter may return a luminance measure of a spot as material feature. The material feature may be determined by $$\varphi_{2m} = \Phi(f, z) = -\int f(x) dx \frac{z^2}{d_{ray} \cdot n},$$

where f is the spot image. The distance of the spot is denoted by z, where z may be obtained for example by using a depth-from-defocus or depth-from-photon ratio technique and/or by using a triangulation technique. The surface normal of the material is given by $n \in \mathbb{R}^3$ and can be obtained as the normal of the surface spanned by at least three measured points. The vector $d_{ray} \in \mathbb{R}^3$ is the direction vector of the light source. Since the position of the spot is known by using a depth-from-defocus or depth-from-photon ratio technique and/or by using a triangulation technique wherein the position of the light source is known as a parameter of the detector system, $d_{ray}$, is the difference vector between spot and light source positions.

For example, the material dependent image filter may be a filter having an output dependent on a spot shape. This material dependent image filter may return a value which correlates to the translucence of a material as material feature. The translucence of materials influences the shape of the spots. The material feature may be given by $$\varphi_{2m} = \Phi(f) = \frac{\int H(f(x) - \alpha h) dx}{\int H(f(x) - \beta h) dx},$$

wherein $0 < \alpha, \beta < 1$ are weights for the spot height h, and H denotes the Heavyside function, i.e. $H(x)=1: x \geq 0$, $H(x)=0: x < 0$. The spot height h may be determined by $h = \int_{B_r} f(x) dx$, where $B_r$ is an inner circle of a spot with radius r.

For example, the material dependent image filter may be a squared norm gradient. This material dependent image filter may return a value which correlates to a measure of soft and hard transitions and/or roughness of a spot as material feature. The material feature may be defined by $\varphi_{2m} = \Phi(f) = \int \|\nabla f(x)\|^2 dx$.

For example, the material dependent image filter may be a standard deviation. The standard deviation of the spot may be determined by $$\varphi_{2m}=\Phi(f)=\int (f(x)-\mu)^2 dx,$$

Wherein μ is the mean value given by $\mu=\int (f(x))dx$.

For example, the material dependent image filter may be a smoothness filter such as a Gaussian filter or median filter. In one embodiment of the smoothness filter, this image filter may refer to the observation that volume scattering exhibits less speckle contrast compared to diffuse scattering materials. This image filter may quantify the smoothness of the spot corresponding to speckle contrast as material feature. The material feature may be determined by $$\varphi_{2m} = \Phi(f, z) = \frac{\int |\mathcal{F}(f)(x) - f(x)| dx}{\int f(x)dx} \cdot \frac{1}{z},$$

wherein $\mathcal{F}$ is a smoothness function, for example a median filter or Gaussian filter. This image filter may comprise dividing by the distance z, as described in the formula above. The distance z may be determined for example using a depth-from-defocus or depth-from-photon ratio technique and/or by using a triangulation technique. This may allow the filter to be insensitive to distance. In one embodiment of the smoothness filter, the smoothness filter may be based on the standard deviation of an extracted speckle noise pattern. A speckle noise pattern N can be described in an empirical way by $$f(x)=f_0(x)\cdot(N(X)+1),$$

where $f_0$ is an image of a despeckled spot. N(X) is the noise term that models the speckle pattern. The computation of a despeckled image may be difficult. Thus, the despeckled image may be approximated with a smoothed version of f, i.e. $f_0 \approx \mathcal{F}(f)$, wherein $\mathcal{F}$ is a smoothness operator like a Gaussian filter or median filter. Thus, an approximation of the speckle pattern may be given by $$N(X) = \frac{f(x)}{\mathcal{F}(f(x))} - 1.$$

The material feature of this filter may be determined by $$\varphi_{2m} = \Phi(f) = \sqrt{\mathrm{Var}\left(\frac{f}{\mathcal{F}(f)} - 1\right)},$$

Wherein Var denotes the variance function.

For example, the image filter may be a grey-level-occurrence-based contrast filter. This material filter may be based on the grey level occurrence matrix $M_{f,\rho}(g_1 G_2)=[p_{g1,g2}]$, whereas $p_{g1,g2}$ is the occurrence rate of the grey combination $(g_1,g_2)=[f(x_1,y_1),f(x_2,y_2)]$, and the relation ρ defines the distance between $(x_1, y_1)$ and $(x_2, y_2)$, which is p(x,y)=(x+a,y+b) with a and b selected from 0,1.

The material feature of the grey-level-occurrence-based contrast filter may be given by $$\varphi_{2m} = \Phi(f) = \sum_{i,j=0}^{N-1} p_{ij}(i-j)^2.$$

For example, the image filter may be a grey-level-occurrence-based energy filter. This material filter is based on the grey level occurrence matrix defined above.

The material feature of the grey-level-occurrence-based energy filter may be given by $$\varphi_{2m} = \Phi(f) = \sum_{i,j=0}^{N-1} (p_{ij})^2.$$

For example, the image filter may be a grey-level-occurrence-based homogeneity filter. This material filter is based on the grey level occurrence matrix defined above.

The material feature of the grey-level-occurrence-based homogeneity filter may be given by $$\varphi_{2m} = \Phi(f) = \sum_{i,j=0}^{N-1} \frac{p_{ij}}{1+|i-j|}.$$

For example, the image filter may be a grey-level-occurrence-based dissimilarity filter. This material filter is based on the grey level occurrence matrix defined above.

The material feature of the grey-level-occurrence-based dissimilarity filter may be given by $$\varphi_{2m} = \Phi(f) = -\sum_{i,j=0}^{N-1} \sqrt{p_{ij}\log(p_{ij})}.$$

For example, the image filter may be a Law's energy filter. This material filter may be based on the laws vector $L_5=[1, 4,6,4,1]$ and $E_5=[-1,-2,0,-2,-1]$ and the matrices $L_5(E_5)^T$ and $E_5(L_5)^T$.

The image $f_k$ is convoluted with these matrices:

$$f^*_{k,L5E5}(x, y) = \sum_{i=-2}^{2}\sum_{j=-2}^{2} f_k(x+i, y+j)L_5(E_5)^T$$

and $$f^*_{k,E5L5}(x, y) = \sum_{i=-2}^{2}\sum_{j=-2}^{2} f_k(x+i, y+j)E_5(L_5)^T.$$

$$E = \int \frac{f^*_{k,L5E5}(x, y)}{\max(f^*_{k,L5E5}(x, y))} dxdy,$$

$$F = \int \frac{f^*_{k,E5L5}(x, y)}{\max(f^*_{k,E5L5}(x, y))} dxdy,$$

Whereas the material feature of Law's energy filter may be determined by $$\varphi_{2m}=\Phi(f)=E/F.$$

For example, the material dependent image filter may be a threshold area filter. This material feature may relate two areas in the image plane. A first area Ω1, may be an area wherein the function f is larger than a times the maximum of f. A second area Ω2, may be an area wherein the function f is smaller than a times the maximum of f, but larger than a threshold value ε times the maximum of f. Preferably α may be 0.5 and ε may be 0.05. Due to speckles or noise, the areas may not simply correspond to an inner and an outer circle around the spot center. As an example, Ω1 may comprise speckles or unconnected areas in the outer circle. The material feature may be determined by $$\varphi_{2m} = \Phi(f) = \frac{\int_{\Omega 1} 1}{\int_{\Omega 2} 1},$$

wherein $\Omega 1=\{x|f(x)>\alpha\cdot\max(f(x))\}$ and $\Omega 2=\{x|\varepsilon\cdot\max(f(x))<f(x)<\alpha\cdot\max(f(x))\}$.

The processing unit may be configured for using at least one predetermined relationship between the material feature $\varphi_{2m}$ and the material property of the surface having generated the reflection feature for determining the material property of the surface having generated the reflection feature. The predetermined relationship may be one or more of an empirical relationship, a semi-empiric relationship and an analytically derived relationship. The processing unit may comprise at least one data storage device for storing the predetermined relationship, such as a lookup list or a lookup table.

While feature based approaches, as the approaches described above, are accurate enough to differentiate between skin and surface-only scattering materials, the differentiation between skin and carefully selected attack materials, which involve volume scattering as well, is more challenging. Step b) may comprise using artificial intelligence, in particular convolutional neuronal networks. Using reflection images as input for convolutional neuronal networks may enable the generation of classification models with sufficient accuracy to differentiate between skin and other volume-scattering materials. Since only physically valid information is passed to the network by selecting important regions in the reflection image, only compact training data sets may be needed. Additionally, very compact network architectures can be generated.

Specifically, in the skin detection step at least one parametrized skin classification model may be used. The parametrized skin classification model may be configured for classifying skin and other materials by using the second image as an input. The skin classification model may be parametrized by using one or more of machine learning, deep learning, neural networks, or other form of artificial intelligence. The term "machine-learning" as used herein is a broad term and is to be given its ordinary and customary meaning to a person of ordinary skill in the art and is not to be limited to a special or customized meaning. The term specifically may refer, without limitation, to a method of using artificial intelligence (AI) for automatically model building, in particular for parametrizing models. The term "skin classification model" may refer to a classification model configured for discriminating human skin from other materials. The property characteristic for skin may be determined by applying an optimization algorithm in terms of at least one optimization target on the skin classification model. The machine learning may be based on at least one neuronal network, in particular a convolutional neural network. Weights and/or topology of the neuronal network may be pre-determined and/or pre-defined. Specifically, the training of the skin classification model may be performed using machine-learning. The skin classification model may comprise at least one machine-learning architecture and model parameters. For example, the machine-learning architecture may be or may comprise one or more of: linear regression, logistic regression, random forest, naive Bayes classifications, nearest neighbors, neural networks, convolutional neural networks, generative adversarial networks, support vector machines, or gradient boosting algorithms or the like. The term "training", also denoted learning, as used herein, is a broad term and is to be given its ordinary and customary meaning to a person of ordinary skill in the art and is not to be limited to a special or customized meaning. The term specifically may refer, without limitation, to a process of building the skin classification model, in particular determining and/or updating parameters of the skin classification model. The skin classification model may be at least partially data-driven. For example, the skin classification model may be based on experimental data, such as data determined by illuminating a plurality of humans and artificial objects such as masks and recording the reflection pattern. For example, the training may comprise using at least one training dataset, wherein the training data set comprises images, in particular second images, of a plurality of humans and artificial objects with known material property.

The skin detection step may comprises using at least one 2D face and facial landmark detection algorithm configured for providing at least two locations of characteristic points of a human face. For example, the locations may be eye locations, forehead or cheeks. 2D face and facial landmark detection algorithms may provide locations of characteristic points of a human face such as eye locations. Since there are subtle differences in the reflection of the different zones of a face (for example forehead or cheeks), region specific models can be trained. In the skin detection step, preferably at least one region specific parametrized skin classification model is used. The skin classification model may comprise a plurality of region specific parametrized skin classification models, such as for different regions, and/or the skin classification model may be trained using region specific data such as by filtering the images used for training. For example, for training two different regions may be used such as eye-cheek region to below the nose and, in particular in case not enough reflection features can be identified within this region, the region of the forehead may be used. However, other regions may be possible, too.

The detected face is characterized as skin if the material property corresponds to at least one property characteristic for skin. The processing unit may be configured for identifying a reflection feature as to be generated by illuminating biological tissue, in particular skin, in case its corresponding material property fulfills the at least one predetermined or predefined criterion. The reflection feature may be identified as to be generated by human skin in case the material property indicates "human skin". The reflection feature may be identified as to be generated by human skin in case the material property is within at least one threshold and/or at least one range. The at least one threshold value and/or range may be stored in a table or a lookup table and may be determined e.g. empirically and may, as an example, be stored in at least one data storage device of the processing unit. The processing unit is configured for identifying the reflection feature as to be background otherwise. Thus, the processing unit may be configured for assigning each projected spot with a material property, e.g. skin yes or no.

The 3D detection step may be performed after the skin detection step and/or the face detection step. However, other embodiments are feasible, in which the 3D detection step is performed before the skin detection step and/or the face detection step. The material property may be determined by evaluating $\varphi_{2m}$ subsequently after determining of the longitudinal coordinate z in step d) such that the information about the longitudinal coordinate z can be considered for evaluating of $\varphi_{2m}$.

The 3D detection step comprises determining the second beam profile information of at least four of the reflection features located inside the image region of the second image corresponding to the image region of the first image comprising the identified geometrical feature by analysis of their beam profiles. The 3D detection step may comprise determining a second beam profile information of at least four of the reflection features by analysis of their respective beam profile. The second beam profile information may comprise a quotient Q of areas of the beam profile.

As used herein, the term "analysis of the beam profile" may generally refer to evaluating of the beam profile and may comprise at least one mathematical operation and/or at least one comparison and/or at least symmetrizing and/or at least one filtering and/or at least one normalizing. For example, the analysis of the beam profile may comprise at least one of a histogram analysis step, a calculation of a difference measure, application of a neural network, application of a machine learning algorithm. The processing unit may be configured for symmetrizing and/or for normalizing and/or for filtering the beam profile, in particular to remove noise or asymmetries from recording under larger angles, recording edges or the like. The processing unit may filter the beam profile by removing high spatial frequencies such as by spatial frequency analysis and/or median filtering or the like. Summarization may be performed by center of intensity of the light spot and averaging all intensities at the same distance to the center. The processing unit may be configured for normalizing the beam profile to a maximum intensity, in particular to account for intensity differences due to the recorded distance. The processing unit may be configured for removing influences from background light from the beam profile, for example, by an imaging without illumination.

The processing unit may be configured for determining at least one longitudinal coordinate $z_{DPR}$ for reflection features located inside the image region of the second image corresponding to the image region of the first image comprising the identified geometrical feature by analysis of the beam profile of the respective reflection feature. The processing unit may be configured for determining the longitudinal coordinate $z_{DPR}$ for the reflection features by using the so called depth-from-photon-ratio technique, also denoted as beam profile analysis. With respect to depth-from-photon-ratio (DPR) technique reference is made to WO 2018/091649 A1, WO 2018/091638 A1 and WO 2018/091640 A1, the full content of which is included by reference.

The processing unit may be configured for determining at least one first area and at least one second area of the reflection beam profile of each of the reflection features and/or of the reflection features in at least one region of interest. The processing unit is configured for integrating the first area and the second area.

The analysis of the beam profile of one of the reflection features may comprise determining at least one first area and at least one second area of the beam profile. The first area of the beam profile may be an area A1 and the second area of the beam profile may be an area A2. The processing unit may be configured for integrating the first area and the second area. The processing unit may be configured to derive a combined signal, in particular a quotient Q, by one or more of dividing the integrated first area and the integrated second area, dividing multiples of the integrated first area and the integrated second area, dividing linear combinations of the integrated first area and the integrated second area. The processing unit may configured for determining at least two areas of the beam profile and/or to segment the beam profile in at least two segments comprising different areas of the beam profile, wherein overlapping of the areas may be possible as long as the areas are not congruent. For example, the processing unit may be configured for determining a plurality of areas such as two, three, four, five, or up to ten areas. The processing unit may be configured for segmenting the light spot into at least two areas of the beam profile and/or to segment the beam profile in at least two segments comprising different areas of the beam profile. The processing unit may be configured for determining for at least two of the areas an integral of the beam profile over the respective area. The processing unit may be configured for comparing at least two of the determined integrals. Specifically, the processing unit may be configured for determining at least one first area and at least one second area of the beam profile. As used herein, the term "area of the beam profile" generally refers to an arbitrary region of the beam profile at the position of the optical sensor used for determining the quotient Q. The first area of the beam profile and the second area of the beam profile may be one or both of adjacent or overlapping regions. The first area of the beam profile and the second area of the beam profile may be not congruent in area. For example, the processing unit may be configured for dividing a sensor region of the CMOS sensor into at least two sub-regions, wherein the processing unit may be configured for dividing the sensor region of the CMOS sensor into at least one left part and at least one right part and/or at least one upper part and at least one lower part and/or at least one inner and at least one outer part. Additionally or alternatively, the camera may comprise at least two optical sensors, wherein the light-sensitive areas of a first optical sensor and of a second optical sensor may be arranged such that the first optical sensor is adapted to determine the first area of the beam profile of the reflection feature and that the second optical sensor is adapted to determine the second area of the beam profile of the reflection feature. The processing unit may be adapted to integrate the first area and the second area. The processing unit may be configured for using at least one predetermined relationship between the quotient Q and the longitudinal coordinate for determining the longitudinal coordinate. The predetermined relationship may be one or more of an empiric relationship, a semi-empiric relationship and an analytically derived relationship. The processing unit may comprise at least one data storage device for storing the predetermined relationship, such as a lookup list or a lookup table.

The first area of the beam profile may comprise essentially edge information of the beam profile and the second area of the beam profile comprises essentially center information of the beam profile, and/or the first area of the beam profile may comprise essentially information about a left part of the beam profile and the second area of the beam profile comprises essentially information about a right part of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably, the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The processing unit may be configured for determining an area integral of the beam profile. The processing unit may be configured for determining the edge information by integrating and/or summing of the first area. The processing unit may be configured for determining the center information by integrating and/or summing of the second area. For example, the beam profile may be a trapezoid beam profile and the processing unit may be configured for determining an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

In one embodiment, A1 may correspond to a full or complete area of a feature point on the optical sensor. A2 may be a central area of the feature point on the optical sensor. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In one embodiment, the illumination pattern may comprise at least one line pattern. A1 may correspond to an area with a full line width of the line pattern on the optical sensors, in particular on the light sensitive area of the optical sensors. The line pattern on the optical sensor may be widened and/or displaced compared to the line pattern of the illumination pattern such that the line width on the optical sensors is increased. In particular, in case of a matrix of optical sensors, the line width of the line pattern on the optical sensors may change from one column to another column. A2 may be a central area of the line pattern on the optical sensor. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern may be segmented on the optical sensors. Each column of the matrix of optical sensors may comprise center information of intensity in the central area of the line pattern and edge information of intensity from regions extending further outwards from the central area to edge regions of the line pattern.

In one embodiment, the illumination pattern may comprise at least point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The illumination pattern may comprise both at least one point pattern and at least one line pattern. Other embodiments in addition or alternatively to line pattern and point pattern are feasible.

The processing unit may be configured to derive a quotient Q by one or more of dividing the integrated first area and the integrated second area, dividing multiples of the integrated first area and the integrated second area, dividing linear combinations of the integrated first area and the integrated second area.

The processing unit may be configured to derive the quotient Q by one or more of dividing the first area and the second area, dividing multiples of the first area and the second area, dividing linear combinations of the first area and the second area. The processing unit may be configured for deriving the quotient Q by $$Q = \frac{\iint_{A1} E(x, y) dx dy}{\iint_{A2} E(x, y) dx dy}$$

wherein x and y are transversal coordinates, A1 and A2 are the first and second area of the beam profile, respectively, and E(x,y) denotes the beam profile.

Additionally or alternatively, the processing unit may be adapted to determine one or both of center information or edge information from at least one slice or cut of the light spot. This may be realized, for example, by replacing the area integrals in the quotient Q by a line integral along the slice or cut. For improved accuracy, several slices or cuts through the light spot may be used and averaged. In case of an elliptical spot profile, averaging over several slices or cuts may result in improved distance information.

For example, in case of the optical sensor having a matrix of pixels, the processing unit may be configured for evaluating the beam profile, by determining the pixel having the highest sensor signal and forming at least one center signal;

evaluating sensor signals of the matrix and forming at least one sum signal;

determining the quotient Q by combining the center signal and the sum signal; and determining at least one longitudinal coordinate z of the object by evaluating the quotient Q.

As used herein, a "sensor signal" generally refers to a signal generated by the optical sensor and/or at least one pixel of the optical sensor in response to illumination. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the display device, the optical sensor or any other element may be adapted to process or preprocess the sensor signal, thereby generating secondary sensor signals, which may also be used as sensor signals, such as preprocessing by filtering or the like. The term "center signal" generally refers to the at least one sensor signal comprising essentially center information of the beam profile. As used herein, the term "highest sensor signal" refers to one or both of a local maximum or a maximum in a region of interest. For example, the center signal may be the signal of the pixel having the highest sensor signal out of the plurality of sensor signals generated by the pixels of the entire matrix or of a region of interest within the matrix, wherein the region of interest may be predetermined or determinable within an image generated by the pixels of the matrix. The center signal may arise from a single pixel or from a group of optical sensors, wherein, in the latter case, as an example, the sensor signals of the group of pixels may be added up, integrated or averaged, in order to determine the center signal. The group of pixels from which the center signal arises may be a group of neighboring pixels, such as pixels having less than a predetermined distance from the actual pixel having the highest sensor signal, or may be a group of pixels generating sensor signals being within a predetermined range from the highest sensor signal. The group of pixels from which the center signal arises may be chosen as large as possible in order to allow maximum dynamic range. The processing unit may be adapted to determine the center signal by integration of the plurality of sensor signals, for example the plurality of pixels around the pixel having the highest sensor signal. For example, the beam profile may be a trapezoid beam profile and the processing unit may be adapted to determine an integral of the trapezoid, in particular of a plateau of the trapezoid.

As outlined above, the center signal generally may be a single sensor signal, such as a sensor signal from the pixel in the center of the light spot, or may be a combination of a plurality of sensor signals, such as a combination of sensor signals arising from pixels in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of pixels containing the pixel having the highest sensor signal and a predetermined group of neighboring pixels; a sum of sensor signals from a group of pixels containing the pixel having the highest sensor signal and a predetermined group of neighboring pixels; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring pixels; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The processing unit may be adapted to determine the sum signal by integrating signals of the entire matrix, or of the region of interest within the matrix. For example, the beam profile may be a trapezoid beam profile and the processing unit may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The quotient Q may be a signal which is generated by combining the center signal and the sum signal. Specifically, the determining may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the quotient Q may comprise an arbitrary signal or signal combination which contains at least one item of information on a comparison between the center signal and the sum signal.

As used herein, the term "longitudinal coordinate for the reflection feature" refers to a distance between the optical sensor and the point of the scene remitting the corresponding illumination features. The processing unit may be configured for using the at least one predetermined relationship between the quotient Q and the longitudinal coordinate for determining the longitudinal coordinate. The predetermined relationship may be one or more of an empiric relationship, a semi-empiric relationship and an analytically derived relationship. The processing unit may comprise at least one data storage device for storing the predetermined relationship, such as a lookup list or a lookup table.

The processing unit may be configured for executing at least one depth-from-photon-ratio algorithm which computes distances for all reflection features with zero order and higher order.

The 3D detection step may comprise determining the at least one depth level from the second beam profile information of said reflection features by using the processing unit.

The processing unit may be configured for determining the depth map of at least parts of the scene by determining at least one depth information of the reflection features located inside the image region of the second image corresponding to the image region of the first image comprising the identified geometrical feature. As used herein, the term "depth" or depth information may refer to a distance between the object and the optical sensor and may be given by the longitudinal coordinate. As used herein, the term "depth map" may refer to spatial distribution of depth. The processing unit may be configured for determining the depth information of the reflection features by one or more of the following techniques: depth-from-photon-ratio, structured light, beam profile analysis, time-of-flight, shape-from-motion, depth-from-focus, triangulation, depth-from-defocus, stereo sensors. The depth map may be a thinly filled depth map comprising a few entries. Alternatively, the depth may be crowded comprising a large amount of entries.

The detected face is characterized as 3D object if the depth level deviates from a pre-determined or pre-defined depth level of plane objects. Step c) may comprise using 3D topology data of the face in front of the camera. The method may comprise determining a curvature from the at least four of the reflection features located inside the image region of the second image corresponding to the image region of the first image comprising the identified geometrical feature. The method may comprise comparing the curvature determined from the at least four of the reflection features to the pre-determined or pre-defined depth level of plane objects. If the curvature exceeds an assumed curvature of plane object the detected face may be characterized as 3D object, otherwise as plane object. The pre-determined or pre-defined depth level of plane objects may be stored in at least one data storage of the processing unit such as a lookup list or a lookup table. The pre-determined or pre-defined level of plane objects may be experimentally determined and/or may be a theoretical level of plane objects. The pre-determined or pre-defined depth level of plane objects may be at least one limit for at least one curvature and/or a range for at least one curvature.

3D features determined step c) may allow differentiating between high quality photographs and a 3D face-like structure. The combination of steps b) and c) may allow strengthening reliability of the authentication with respect to attacks. 3D features can be combined with material features to increase the security level. Since the same computational pipeline can be used to generate the input data for the skin classification and the generation of the 3D point cloud, both properties can be calculated from the same frame with low computational effort.

Preferably subsequent to steps a) to c) the authentication step may be performed. The authentication step may be performed partially after each of steps a) to c). The authentication may be aborted in case in step a) no face is detected and/or in step b) the reflection features is determined not to be generated by skin and/or in step c) the depth map refers to a plane object. The authentication step comprises authenticating the detected face by using at least one authentication unit if in step b) the detected face is characterized as skin and in step c) the detected face is characterized as 3D object.

Steps a) to d) may be performed by using at least one device, for example at least one mobile device such as a mobile phone, smartphone and the like, wherein access of the device is secured by using face authentication. Other devices may be possible, too such as an access control device controlling access to buildings, machines, automobiles and the like. The method may comprise permitting access to the device if the detected face is authenticated.

The method may comprise at least one enrollment step. In the enrollment step a user of the device may be enrolled. As used herein, the term "enrolling" may refer to a process of registering and/or signing up and/or teach in of a user for subsequent usage of the device. Usually, enrolling may be performed at first use of the device and/or for initiating the device. However, embodiments are feasible in which a plurality of users may be enrolled, e.g. successively, such that the enrolling may be performed and/or repeated at an arbitrary time during usage of the device. The enrolling may comprise generating a user account and/or user profile. The enrolling may comprise entering and storing user data, in particular image data, via at least one user interface. Specifically, at least one 2D image of the user is stored in at least one database. The enrollment step may comprise imaging at least one image of the user, in particular a plurality of images. The images may be recorded from different direction and/or the user may change his orientation. Additionally, the enrollment step may comprise generating at least one 3D image and/or a depth map for the user which may be used in step d) for comparison. The database may a database of the device, e.g. of the processing unit, and/or may be an external database such as a cloud. The method comprises identifying the user by comparing the 2D image of the user with the first image. The method according to the present invention may allow significantly improving the presentation attack detection capabilities of biometric authentication methods. In order improve the overall authentication, person specific material fingerprints as well as 3D topological features may be stored during the enrollment process in addition to the 2D image of the user. This may allow a multifactor authentication within one device by using 2D, 3D and material-derived features.

The method according to the present invention using beam profile analysis technology may provide a concept to reliably detect human skin by analyzing reflections of laser spots, in particular in the NIR regime, on a face and distinguish it from reflections coming from attack materials that were produced to mimic a face. Additionally, beam profile analysis simultaneously provides depth information by analyzing the same camera frame. Therefore, 3D as well as skin security features may be provided by the exact same technology.

Since also the 2D image of the face can be recorded by simply switching off the laser illumination, a fully secure face recognition pipeline can be established solving the above-stated problem.

The reflection properties of human skin with respect to ethnic origin become more similar when the laser wavelength is shifted towards the NIR regime. At a wavelength of 940 nm differences are at a minimum. Accordingly, different ethnic origins do not play a role for skin authentication.

No time-consuming analysis of a series of frames may be necessary since presentation attack detection (via skin classification) is provided by just one frame. A time frame for performing the complete method may be ≤500 ms, preferably ≤250 ms. However, embodiments may be feasible in which the skin detection may be performed using a plurality of frames. Depending on confidence for identifying reflection features in the second image, and speed of the method, the method may comprise sampling reflection features over several frames in order to reach a more stable classification.

Besides accuracy, also execution speed and power consumption are important requirements. Further restrictions on the availability of computational resources can be introduced by security considerations. For example, steps a) to d) may have run in a secure zone of the processing unit to avoid any software-based manipulations during program execution. The compact nature of the above described material detection networks may solve this problem by showing excellent runtime behavior in the said secure zone, whereas traditional PAD solutions require the examination of several consecutive frames which results in large computational cost and longer response times of the algorithm.

In a further aspect of the present invention a computer program for face authentication configured for causing a computer or a computer network to fully or partially perform the method according to the present invention, when executed on the computer or the computer network, wherein the computer program is configured for performing and/or executing at least steps a) to d) of the method according to the present invention. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hard-ware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps as indicated above may be performed by using a computer or a computer network, preferably by using a computer program.

In a further aspect a computer-readable storage medium comprising instructions which, when executed by a computer or computer network, cause to carry out at least steps a) to d) of the method according to the present invention.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the methods according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work.

Specifically, further disclosed herein are:
a computer or computer network comprising at least one processor, wherein the processor is adapted to perform the method according to one of the embodiments described in this description,
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding embodiment, wherein the program means are stored on a storage medium readable to a computer,
a storage medium, wherein a data structure is stored on the storage medium and wherein the data structure is adapted to perform the methods according to one of the embodiments described in this description after having been loaded into a main and/or working storage of a computer or of a computer network, and
a computer program product having program code means, wherein the program code means can be stored or are stored on a storage medium, for performing the method according to one of the embodiments described in this description, if the program code means are executed on a computer or on a computer network.

In a further aspect a mobile device comprising at least one camera, at least one illumination unit and at least one processing unit is disclosed. The mobile device is configured for performing at least steps a) to c), and optionally step d) of the method for face authentication according to the present invention. Step d) may be performed by using at least one authentication unit. The authentication unit may be a unit of the mobile device or may be an external authentication unit. With respect to definitions and embodiments of the mobile device reference is made to definitions and embodiments described with respect to the method.

In a further aspect of the present invention, use of the method according to the present invention, such as according to one or more of the embodiments given above or given in further detail below, is proposed, for a purpose of use for biometric presentation attack detection.

Overall, in the context of the present invention, the following embodiments are regarded as preferred:

Embodiment 1 Method for face authentication comprising the following steps:
- a) at least one face detection step, wherein the face detection step comprises determining at least one first image by using at least one camera, wherein the first image comprises at least one two-dimensional image of a scene suspected to comprise the face, wherein the face detection step comprises detecting the face in the first image by identifying in the first image at least one pre-defined or pre-determined geometrical feature characteristic for faces by using at least one processing unit;
- b) at least one skin detection step, wherein the skin detection step comprises projecting at least one illumination pattern comprising a plurality of illumination features on the scene by using at least one illumination unit and determining at least one second image using the at least one camera, wherein the second image comprises a plurality of reflection features generated by the scene in response to illumination by the illumination features, wherein each of the reflection features comprises at least one beam profile, wherein the skin detection step comprises determining a first beam profile information of at least one of the reflection features located inside an image region of the second image corresponding to an image region of the first image comprising the identified geometrical feature by analysis of its beam profile and determining at least one material property of the reflection feature from the first beam profile information by using the processing unit, wherein the detected face is characterized as skin if the material property corresponds to at least one property characteristic for skin;
- c) at least one 3D detection step, wherein the 3D detection step comprises determining a second beam profile information of at least four of the reflection features located inside the image region of the second image corresponding to the image region of the first image comprising the identified geometrical feature by analysis of their beam profiles and determining at least one depth level from the second beam profile information of said reflection features by using the processing unit, wherein the detected face is characterized as 3D object if the depth level deviates from a pre-determined or pre-defined depth level of plane objects;
- d) at least one authentication step, wherein the authentication step comprises authenticating the detected face by using at least one authentication unit if in step b) the detected face is characterized as skin and in step c) the detected face is characterized as 3D object.

Embodiment 2 The method according to the preceding embodiment, wherein steps a) to d) are performed by using at least one device, wherein access of the device is secured by using face authentication, wherein the method comprises permitting access to the device if the detected face is authenticated.

Embodiment 3 The method according to the preceding embodiment, wherein the method comprises at least one enrollment step, wherein in the enrollment step a user of the device is enrolled, wherein at least one 2D image of the user is stored in at least one database, wherein the method comprises identifying the user by comparing the 2D image of the user with the first image.

Embodiment 4 The method according to any one of the preceding embodiments, wherein in the skin detection step at least one parametrized skin classification model is used, wherein the parametrized skin classification model is configured for classifying skin and other materials by using the second image as an input.

Embodiment 5 The method according to the preceding embodiment, wherein the skin classification model is parametrized by using machine learning, wherein the property characteristic for skin is determined by applying an optimization algorithm in terms of at least one optimization target on the skin classification model.

Embodiment 6 The method according to any one of the two preceding embodiments, wherein the skin detection step comprises using at least one 2D face and facial landmark detection algorithm configured for providing at least two locations of characteristic points of a human face, wherein in the skin detection step at least one region specific parametrized skin classification model is used.

Embodiment 7 The method according to any one of the preceding embodiments, wherein the illumination pattern comprises a periodic grid of laser spots.

Embodiment 8 The method according to any one of the preceding embodiments, wherein the illumination features have wavelengths in a near infrared (NIR) regime.

Embodiment 9 The method according to the preceding embodiment, wherein the illumination features have wavelengths of 940 nm.

Embodiment 10 The method according to any one of the preceding embodiments, wherein a plurality of second images is determined, wherein the reflection features of the plurality of second images are used for skin detection in step b) and/or for 3D detection in step c).

Embodiment 11 The method according to any one of the preceding embodiments, wherein the camera is or comprises at least one near infrared camera.

Embodiment 12 Computer program for face authentication configured for causing a computer or a computer network to fully or partially perform the method according to any one of the preceding embodiments, when executed on the computer or the computer network, wherein the computer program is configured for performing and/or executing at least steps a) to d) of the method according to any one of the preceding embodiments.

Embodiment 13 A computer-readable storage medium comprising instructions which, when executed by a computer or computer network, cause to carry out at least steps a) to d) of the method according to any one of the preceding embodiments referring to a method.

Embodiment 14 A mobile device comprising at least one camera, at least one illumination unit and at least one processing unit, the mobile device being configured for performing at least steps a) to c), and optionally step d), of the method for face authentication according to any one of the preceding embodiments referring to a method.

Embodiment 15 Use of the method according to any one of the preceding claims for biometric presentation attack detection.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
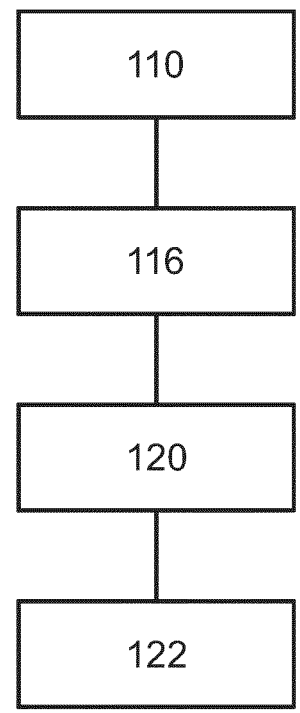
FIG. 1 shows an embodiment of a method for face authentication according to the present invention.

FIG. 1 shows a flow chart of a method for face authentication according to the present invention. The face authentication may comprise verifying a recognized object or part of the recognized object as human face. Specifically, the authentication may comprise distinguishing a real human face from attack materials that were produced to mimic a face. The authentication may comprise verifying identity of a respective user and/or assigning identity to a user. The authentication may comprise generating and/or providing identity information, e.g. to other devices such as to at least one authorization device for authorization for access of a mobile device, a machine, an automobile, a building or the like. The identify information may be proofed by the authentication. For example, the identity information may be and/or may comprise at least one identity token. In case of successful authentication the recognized object or part of the recognized object is verified to be a real face and/or the identity of the object, in particular a user, is verified.

The method comprises the following steps:

a) (reference number 110) at least one face detection step, wherein the face detection step comprises determining at least one first image by using at least one camera 112, wherein the first image comprises at least one two-dimensional image of a scene suspected to comprise the face, wherein the face detection step comprises detecting the face in the first image by identifying in the first image at least one pre-defined or pre-determined geometrical feature characteristic for faces by using at least one processing unit 114;

b) (reference number 116) at least one skin detection step, wherein the skin detection step comprises projecting at least one illumination pattern comprising a plurality of illumination features on the scene by using at least one illumination unit 118 and determining at least one second image using the at least one camera 112, wherein the second image comprises a plurality of reflection features generated by the scene in response to illumination by the illumination features, wherein each of the reflection features comprises at least one beam profile, wherein the skin detection step comprises determining a first beam profile information of at least one of the reflection features located inside an image region of the second image corresponding to an image region of the first image comprising the identified geometrical feature by analysis of its beam profile and determining at least one material property of the reflection feature from the first beam profile information by using the processing unit 114, wherein the detected face is characterized as skin if the material property corresponds to at least one property characteristic for skin;

c) (reference number 120) at least one 3D detection step, wherein the 3D detection step comprises determining a second beam profile information of at least four of the reflection features located inside the image region of the second image corresponding to the image region of the first image comprising the identified geometrical feature by analysis of their beam profiles and determining at least one depth level from the second beam profile information of said reflection features by using the processing unit 114, wherein the detected face is characterized as 3D object if the depth level deviates from a pre-determined or pre-defined depth level of plane objects;

d) (reference number 122) at least one authentication step, wherein the authentication step comprises authenticating the detected face by using at least one authentication unit if in step b) the detected face is characterized as skin and in step c) the detected face is characterized as 3D object.

The method steps may be performed in the given order or may be performed in a different order. Further, one or more additional method steps may be present which are not listed. Further, one, more than one or even all of the method steps may be performed repeatedly.

The camera 112 may comprise at least one imaging element configured for recording or capturing spatially resolved one-dimensional, two-dimensional or even three-dimensional optical data or information. The camera 112 may be a digital camera. As an example, the camera 112 may comprise at least one camera chip, such as at least one CCD chip and/or at least one CMOS chip configured for recording images. The camera 112 may be or may comprise at least one near infrared camera. The image may relate to data recorded by using the camera 112, such as a plurality of electronic readings from the imaging device, such as the pixels of the camera chip. The camera 112, besides the at least one camera chip or imaging chip, may comprise further elements, such as one or more optical elements, e.g. one or more lenses. As an example, the camera 112 may be a fix-focus camera, having at least one lens which is fixedly adjusted with respect to the camera. Alternatively, however, the camera 112 may also comprise one or more variable lenses which may be adjusted, automatically or manually.

Figure 2:
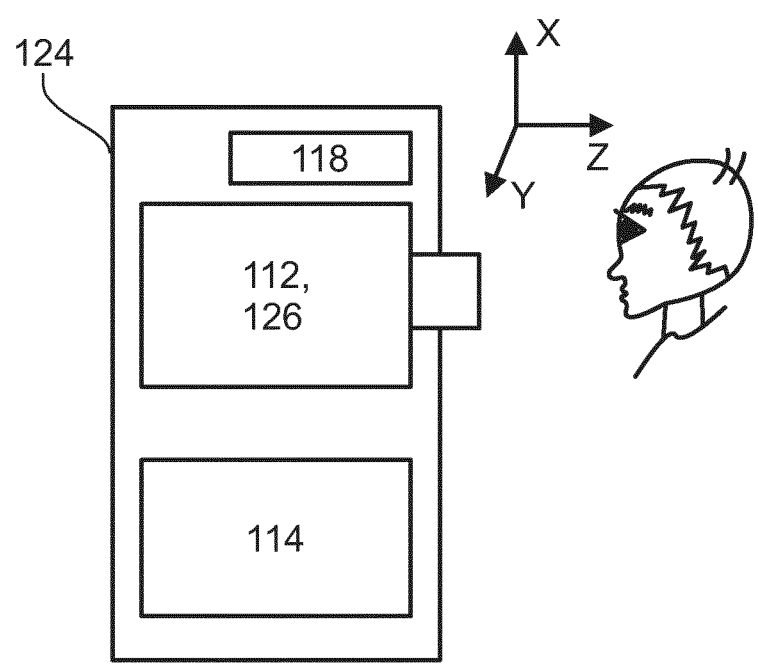
FIG. 2 shows an embodiment of a mobile device according to the present invention.

The camera 112 may be a camera of a mobile device 124 such as of notebook computers, tablets or, specifically, cell phones such as smart phones and the like. Thus, specifically, the camera 112 may be part of the mobile device 124 which, besides the at least one camera 112, comprises one or more data processing devices such as one or more data processors. Other cameras, however, are feasible. The mobile device 124 may be a mobile electronics device, more specifically to a mobile communication device such as a cell phone or smart phone. Additionally or alternatively, the mobile device 124 may also refer to a tablet computer or another type of portable computer. An embodiment of a mobile device according to the present invention is shown in FIG. 2.

Specifically, the camera 112 may be or may comprise at least one optical sensor 126 having at least one light-sensitive area. The optical sensor 126 specifically may be or may comprise at least one photodetector, preferably inorganic photodetectors, more preferably inorganic semiconductor photodetectors, most preferably silicon photodetectors. Specifically, the optical sensor 126 may be sensitive in the infrared spectral range. The optical sensor 126 may comprise at least one sensor element comprising a matrix of pixels. All pixels of the matrix or at least a group of the optical sensors of the matrix specifically may be identical. Groups of identical pixels of the matrix specifically may be provided for different spectral ranges, or all pixels may be identical in terms of spectral sensitivity. Further, the pixels may be identical in size and/or with regard to their electronic or optoelectronic properties. Specifically, the optical sensor 126 may be or may comprise at least one array of inorganic photodiodes which are sensitive in the infrared spectral range, preferably in the range of 700 nm to 3.0 micrometers. Specifically, the optical sensor 126 may be sensitive in the part of the near infrared region where silicon photodiodes are applicable specifically in the range of 700 nm to 1100 nm. Infrared optical sensors which may be used for optical sensors may be commercially available infrared optical sensors, such as infrared optical sensors commercially available under the brand name Hertzstueck™ from trinamiX™ GmbH, D-67056 Ludwigshafen am Rhein, Germany. Thus, as an example, the optical sensor 126 may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensor may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensor 126 may comprise at least one photoconductive sensor such as a PbS or PbSe sensor, a bolometer, preferably a bolometer selected from the group consisting of a VO bolometer and an amorphous Si bolometer.

Specifically, the optical sensor 126 may be sensitive in the near infrared region. Specifically, the optical sensor 126 may be sensitive in the part of the near infrared region where silicon photodiodes are applicable specifically in the range of 700 nm to 1000 nm. The optical sensor 126, specifically, may be sensitive in the infrared spectral range, specifically in the range of 780 nm to 3.0 micrometers. For example, the optical sensor 126 may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

The camera 112 further may comprise at least one transfer device (not shown here). The camera 112 may comprise at least one optical element selected from the group consisting of: transfer device, such as at least one lens and/or at least one lens system, at least one diffractive optical element. The transfer device may be adapted to guide the light beam onto the optical sensor 126. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may have a focal length. Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. The transfer device may constitute a coordinate system, wherein a longitudinal coordinate is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The camera 112 is configured for determining at least one image of the scene, in particular the first image. The scene may refer to a spatial region. The scene may comprise the face under authentication and a surrounding environment. The first image itself may comprise pixels, the pixels of the image correlating to pixels of the matrix of the sensor element. The first image is at least one two-dimensional image having information about transversal coordinates such as the dimensions of height and width.

The face detection step 110 comprises detecting the face in the first image by identifying in the first image the at least one pre-defined or pre-determined geometrical feature characteristic for faces by using the at least one processing unit 114. As an example, the at least one processing unit 114 may comprise a software code stored thereon comprising a number of computer commands. The processing unit 114 may provide one or more hardware elements for performing one or more of the named operations and/or may provide one or more processors with software running thereon for performing one or more of the named operations. Operations, including evaluating the images may be performed by the at least one processing unit 114. Thus, as an example, one or more instructions may be implemented in software and/or hardware. Thus, as an example, the processing unit 114 may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the processing unit may also fully or partially be embodied by hardware. The processing unit 114 and the camera 112 may fully or partially be integrated into a single device. Thus, generally, the processing unit 114 also may form part of the camera 112. Alternatively, the processing unit 114 and the camera 112 may fully or partially be embodied as separate devices.

The detecting of the face in the first image may comprise identifying the at least one pre-defined or pre-determined geometrical feature characteristic for faces. The geometrical feature characteristic for faces may be at least one geometry-based feature which describe the shape of the face and its components, in particular one or more of nose, eyes, mouth or eyebrow and the like. The processing unit 114 may comprise at least one database wherein the geometrical feature characteristic for faces are stored such as in a lookup table. Techniques for identifying the at least one pre-defined or pre-determined geometrical feature characteristic for faces are generally known to the skilled person. For example, the face detection may be performed as described in Masi, Lacopo, et al. "Deep face recognition: A survey" 2018 31st SIBGRAPI conference on graphics, patterns and images (SIBGRAPI), IEEE, 2018, the full content of which is included by reference.

The processing unit 114 may be configured for performing at least one image analysis and/or image processing in order to identify the geometrical feature. The image analysis and/or image processing may use at least one feature detection algorithm. The image analysis and/or image processing may comprise one or more of the following: a filtering; a selection of at least one region of interest; a background correction; a decomposition into color channels; a decomposition into hue, saturation, and/or brightness channels; a frequency decomposition; a singular value decomposition; applying a blob detector; applying a corner detector; applying a Determinant of Hessian filter; applying a principle curvature-based region detector; applying a gradient location and orientation histogram algorithm; applying a histogram of oriented gradients descriptor; applying an edge detector; applying a differential edge detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing a feature within the first image.

Specifically subsequent to the face detection step 110, the skin detection step 116 may be performed comprising projecting at least one illumination pattern comprising a plurality of illumination features on the scene by using the at least one illumination unit 118. However, embodiments are feasible wherein the skin detection step 116 is performed before the face detection step 110.

The illumination unit 118 may be configured for providing the illumination pattern for illumination of the scene. The illumination unit 118 may be adapted to directly or indirectly illuminating the scene, wherein the illumination pattern is remitted, in particular reflected or scattered, by surfaces of the scene and, thereby, is at least partially directed towards the camera. The illumination unit 118 may be configured for illuminating the scene, for example, by directing a light beam towards the scene, which reflects the light beam. The illumination unit 118 may be configured for generating an illuminating light beam for illuminating the scene.

The illumination unit 118 may comprise at least one light source. The illumination unit 118 may comprise a plurality of light sources. The illumination unit 118 may comprise an artificial illumination source, in particular at least one laser source and/or at least one incandescent lamp and/or at least one semiconductor light source, for example, at least one light-emitting diode, in particular an organic and/or inorganic light-emitting diode. The illumination unit 118 may be configured for generating the at least one illumination pattern in the infrared region. The illumination features may have wavelengths in a near infrared (NIR) regime. The illumination features may have wavelengths of about 940 nm. At this wavelength Melanin absorption runs out so that dark and light complecion reflect light almost identical. However, other wavelength in the NIR region may be possible such as one or more of 805 nm, 830 nm, 835 nm, 850 nm, 905 nm, or 980 nm. Moreover, using light in the near infrared region allows that light is not or only weakly detected by human eyes and is still detectable by silicon sensors, in particular standard silicon sensors.

The illumination unit 118 may be or may comprise at least one multiple beam light source. For example, the illumination unit 118 may comprise at least one laser source and one or more diffractive optical elements (DOEs). Specifically, the illumination unit 118 may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs and/or light bulbs. The illumination unit 118 may comprise one or more diffractive optical elements (DOEs) adapted to generate the illumination pattern. For example, the illumination unit 118 may be adapted to generate and/or to project a cloud of points, for example the illumination unit 118 may comprise one or more of at least one digital light processing projector, at least one LCoS projector, at least one spatial light modulator; at least one diffractive optical element; at least one array of light emitting diodes; at least one array of laser light sources. On account of their generally defined beam profiles and other properties of handleability, the use of at least one laser source as the illumination unit 118 is particularly preferred. The illumination unit 118 may be integrated into a housing of the camera 112 or may be separated from the camera 112.

The illumination pattern comprises at least one illumination feature adapted to illuminate at least one part of the scene. The illumination pattern may comprise a single illumination feature. The illumination pattern may comprise a plurality of illumination features. The illumination pattern may be selected from the group consisting of: at least one point pattern; at least one line pattern; at least one stripe pattern; at least one checkerboard pattern; at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the illumination unit 118 may be adapted to generate and/or to project a cloud of points. The illumination unit 118 may comprise the at least one light projector adapted to generate a cloud of points such that the illumination pattern may comprise a plurality of point pattern. The illumination pattern may comprise a periodic grid of laser spots. The illumination unit 118 may comprise at least one mask adapted to generate the illumination pattern from at least one light beam generated by the illumination unit 118.

The skin detection step 116 comprises determining the at least one second image, also denoted as reflection image, using the camera 112. The method may comprise determining plurality of second images. The reflection features of the plurality of second images may be used for skin detection in step b) and/or for 3D detection in step c). The reflection feature may be a feature in an image plane generated by the scene in response to illumination, specifically with at least one illumination feature. Each of the reflection features comprises at least one beam profile, also denoted reflection beam profile. The beam profile of the reflection feature may generally refer to at least one intensity distribution of the reflection feature, such as of a light spot on the optical sensor, as a function of the pixel. The beam profile may be selected from the group consisting of a trapezoid beam profile; a triangle beam profile; a conical beam profile and a linear combination of Gaussian beam profiles.

The evaluation of the second image may comprise identifying the reflection features of the second image. The processing unit 114 may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing a feature within the image generated by the optical sensor 126.

For example, the illumination unit 118 may be configured for generating and/or projecting a cloud of points such that a plurality of illuminated regions is generated on the optical sensor 126, for example the CMOS detector. Additionally, disturbances may be present on the optical sensor 126 such as disturbances due to speckles and/or extraneous light and/or multiple reflections. The processing unit 114 may be adapted to determine at least one region of interest, for example one or more pixels illuminated by the light beam which are used for determination of the longitudinal coordinate for the respective reflection feature, which will be described in more detail below. For example, the processing unit 114 may be adapted to perform a filtering method, for example, a blob-analysis and/or an edge filter and/or object recognition method.

The processing unit 114 may be configured for performing at least one image correction. The image correction may comprise at least one background subtraction. The processing unit 114 may be adapted to remove influences from background light from the beam profile, for example, by an imaging without further illumination.

The processing unit 114 may be configured for determining the beam profile of the respective reflection feature. The determining the beam profile may comprise identifying at least one reflection feature provided by the optical sensor 126 and/or selecting at least one reflection feature provided by the optical sensor 126 and evaluating at least one intensity distribution of the reflection feature. As an example, a region of the matrix may be used and evaluated for determining the intensity distribution, such as a three-dimensional intensity distribution or a two-dimensional intensity distribution, such as along an axis or line through the matrix. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The processing unit 114 is configured for determining a first beam profile information of at least one of the reflection features located inside an image region of the second image corresponding to an image region of the first image comprising the identified geometrical feature by analysis of its beam profile. The method may comprise identifying the image region of the second image corresponding to the image region of the first image comprising the identified geometrical feature. Specifically, the method may comprise matching pixels of the first image and the second image and selecting the pixels of the second image corresponding to the image region of the first image comprising the identified geometrical feature. The method may comprise considering in addition further reflection features located outside said image region of the second image.

The beam profile information may be or may comprise arbitrary information and/or property derived from and/or relating to the beam profile of the reflection feature. The first and the second beam profile information may be identical or may be different. For example, the first beam profile information may be an intensity distribution, a reflection profile, a center of intensity, a material feature. For skin detection in step b) 116, beam profile analysis may be used. Specifically, beam profile analysis makes use of reflection properties of coherent light projected onto object surfaces to classify materials. The classification of materials may be performed as described in WO 2020/187719, in EP application 20159984.2 filed on Feb. 28, 2020 and/or EP application 20 154 961.5 filed on Jan. 31, 2020, the full content of which is included by reference. Specifically, a periodic grid of laser spots, e.g. a hexagonal grid as described in EP application 20 170 905.2 filed on Apr. 22, 2020, is projected and the reflection image is recorded with the camera. Analyzing the beam profile of each reflection feature recorded by the camera may be performed by feature-based methods. With respect to feature-based methods reference is made to the description above. The feature based methods may be used in combination with machine learning methods which may allow parametrization of a skin classification model. Alternatively or in combination, convolutional neuronal networks may be utilized to classify skin by using the reflection images as an input.

The skin detection step 116 may comprise determining at least one material property of the reflection feature from the beam profile information by using the processing unit 114. Specifically, the processing unit 114 is configured for identifying a reflection feature as to be generated by illuminating biological tissue, in particular human skin, in case its reflection beam profile fulfills at least one predetermined or predefined criterion. The at least one predetermined or predefined criterion may be at least one property and/or value suitable to distinguish biological tissue, in particular human skin, from other materials. The predetermined or predefined criterion may be or may comprise at least one predetermined or predefined value and/or threshold and/or threshold range referring to a material property. The reflection feature may be indicated as to be generated by biological tissue in case the reflection beam profile fulfills the at least one predetermined or predefined criterion. The processing unit is configured for identifying the reflection feature as to be non-skin otherwise. Specifically, the processing unit 114 may be configured for skin detection, in particular for identifying if the detected face is human skin. The identification if the material is biological tissue, in particular human skin, may comprise to determining and/or validating whether a surface to be examined or under test is or comprises biological tissue, in particular human skin, and/or to distinguish biological tissue, in particular human skin, from other tissues, in particular other surfaces. The method according to the present invention may allow for distinguishing human skin from one or more of inorganic tissue, metal surfaces, plastics surfaces, foam, paper, wood, a display, a screen, cloth. The method according to the present invention may allow for distinguishing human biological tissue from surfaces of artificial or non-living objects.

The processing unit 114 may be configured for determining the material property m of the surface remitting the reflection feature by evaluating the beam profile of the reflection feature. The material property may be at least one arbitrary property of the material configured for characterizing and/or identification and/or classification of the material. For example, the material property may be a property selected from the group consisting of: roughness, penetration depth of light into the material, a property characterizing the material as biological or non-biological material, a reflectivity, a specular reflectivity, a diffuse reflectivity, a surface property, a measure for translucence, a scattering, specifically a back-scattering behavior or the like. The at least one material property may be a property selected from the group consisting of: a scattering coefficient, a translucency, a transparency, a deviation from a Lambertian surface reflection, a speckle, and the like. The determining at least one material property may comprise assigning the material property to the detected face. The processing unit 114 may comprise at least one database comprising a list and/or table, such as a lookup list or a lookup table, of predefined and/or predetermined material properties. The list and/or table of material properties may be determined and/or generated by performing at least one test measurement, for example by performing material tests using samples having known material properties. The list and/or table of material properties may be determined and/or generated at the manufacturer site and/or by a user. The material property may additionally be assigned to a material classifier such as one or more of a material name, a material group such as biological or non-biological material, translucent or non-translucent materials, metal or non-metal, skin or non-skin, fur or non-fur, carpet or non-carpet, reflective or non-reflective, specular reflective or non-specular reflective, foam or non-foam, hair or non-hair, roughness groups or the like. The processing unit 114 may comprise at least one database comprising a list and/or table comprising the material properties and associated material name and/or material group.

While feature based approaches are accurate enough to differentiate between skin and surface-only scattering materials, the differentiation between skin and carefully selected attack materials, which involve volume scattering as well, is more challenging. Step b) 116 may comprise using artificial intelligence, in particular convolutional neuronal networks. Using reflection images as input for convolutional neuronal networks may enable the generation of classification models with sufficient accuracy to differentiate between skin and other volume-scattering materials. Since only physically valid information is passed to the network by selecting important regions in the reflection image, only compact training data sets may be needed. Additionally, very compact network architectures can be generated.

Specifically, in the skin detection step 116 at least one parametrized skin classification model may be used. The parametrized skin classification model may be configured for classifying skin and other materials by using the second image as an input. The skin classification model may be parametrized by using one or more of machine learning, deep learning, neural networks, or other form of artificial intelligence. The machine-learning may comprise a method of using artificial intelligence (AI) for automatically model building, in particular for parametrizing models. The skin classification model may comprise a classification model configured for discriminating human skin from other materials. The property characteristic for skin may be determined by applying an optimization algorithm in terms of at least one optimization target on the skin classification model. The machine learning may be based on at least one neuronal network, in particular a convolutional neural network. Weights and/or topology of the neuronal network may be predetermined and/or pre-defined. Specifically, the training of the skin classification model may be performed using machine-learning. The skin classification model may comprise at least one machine-learning architecture and model parameters. For example, the machine-learning architecture may be or may comprise one or more of: linear regression, logistic regression, random forest, naive Bayes classifications, nearest neighbors, neural networks, convolutional neural networks, generative adversarial networks, support vector machines, or gradient boosting algorithms or the like. The training may comprise a process of building the skin classification model, in particular determining and/or updating parameters of the skin classification model. The skin classification model may be at least partially data-driven. For example, the skin classification model may be based on experimental data, such as data determined by illuminating a plurality of humans and artificial objects such as masks and recording the reflection pattern. For example, the training may comprise using at least one training dataset, wherein the training data set comprises images, in particular second images, of a plurality of humans and artificial objects with known material property.

The skin detection step 116 may comprises using at least one 2D face and facial landmark detection algorithm configured for providing at least two locations of characteristic points of a human face. For example, the locations may be eye locations, forehead or cheeks. 2D face and facial landmark detection algorithms may provide locations of characteristic points of a human face such as eye locations. Since there are subtle differences in the reflection of the different zones of a face (for example forehead or cheeks), region specific models can be trained. In the skin detection step 116, preferably at least one region specific parametrized skin classification model is used. The skin classification model may comprise a plurality of region specific parametrized skin classification models, such as for different regions, and/or the skin classification model may be trained using region specific data such as by filtering the images used for training. For example, for training two different regions may be used such as eye-cheek region to below the nose and, in particular in case not enough reflection features can be identified within this region, the region of the forehead may be used. However, other regions may be possible, too.

The detected face is characterized as skin if the material property corresponds to at least one property characteristic for skin. The processing unit 114 may be configured for identifying a reflection feature as to be generated by illuminating biological tissue, in particular skin, in case its corresponding material property fulfills the at least one predetermined or predefined criterion. The reflection feature may be identified as to be generated by human skin in case the material property indicates "human skin". The reflection feature may be identified as to be generated by human skin in case the material property is within at least one threshold and/or at least one range. The at least one threshold value and/or range may be stored in a table or a lookup table and may be determined e.g. empirically and may, as an example, be stored in at least one data storage device of the processing unit. The processing unit 114 is configured for identifying the reflection feature as to be background otherwise. Thus, the processing unit 114 may be configured for assigning each projected spot with a material property, e.g. skin yes or no.

The 3D detection step 120 may be performed after the skin detection step 116 and/or the face detection step 110. However, other embodiments are feasible, in which the 3D detection step 120 is performed before the skin detection step 116 and/or the face detection step 110.

The 3D detection step 120 comprises determining the second beam profile information of at least four of the reflection features located inside the image region of the second image corresponding to the image region of the first image comprising the identified geometrical feature by analysis of their beam profiles. The second beam profile information may comprise a quotient Q of areas of the beam profile.

The analysis of the beam profile may comprise evaluating of the beam profile and may comprise at least one mathematical operation and/or at least one comparison and/or at least symmetrizing and/or at least one filtering and/or at least one normalizing. For example, the analysis of the beam profile may comprise at least one of a histogram analysis step, a calculation of a difference measure, application of a neural network, application of a machine learning algorithm. The processing unit 114 may be configured for symmetrizing and/or for normalizing and/or for filtering the beam profile, in particular to remove noise or asymmetries from recording under larger angles, recording edges or the like. The processing unit 114 may filter the beam profile by removing high spatial frequencies such as by spatial frequency analysis and/or median filtering or the like. Summarization may be performed by center of intensity of the light spot and averaging all intensities at the same distance to the center. The processing unit 114 may be configured for normalizing the beam profile to a maximum intensity, in particular to account for intensity differences due to the recorded distance. The processing unit 114 may be configured for removing influences from background light from the beam profile, for example, by an imaging without illumination.

The processing unit 114 may be configured for determining at least one longitudinal coordinate $z_{DPR}$ for reflection features located inside the image region of the second image corresponding to the image region of the first image comprising the identified geometrical feature by analysis of the beam profile of the respective reflection feature. The processing unit 114 may be configured for determining the longitudinal coordinate $z_{DPR}$ for the reflection features by using the so called depth-from-photon-ratio technique, also denoted as beam profile analysis. With respect to depth-from-photon-ratio (DPR) technique reference is made to WO 2018/091649 A1, WO 2018/091638 A1 and WO 2018/091640 A1, the full content of which is included by reference.

The longitudinal coordinate for the reflection feature may be a distance between the optical sensor 126 and the point of the scene remitting the corresponding illumination features. The analysis of the beam profile of one of the reflection features may comprise determining at least one first area and at least one second area of the beam profile. The first area of the beam profile may be an area A1 and the second area of the beam profile may be an area A2. The processing unit 114 may be configured for integrating the first area and the second area. The processing unit 114 may be configured to derive a combined signal, in particular a quotient Q, by one or more of dividing the integrated first area and the integrated second area, dividing multiples of the integrated first area and the integrated second area, dividing linear combinations of the integrated first area and the integrated second area. The processing unit 114 may configured for determining at least two areas of the beam profile and/or to segment the beam profile in at least two segments comprising different areas of the beam profile, wherein overlapping of the areas may be possible as long as the areas are not congruent. For example, the processing unit 114 may be configured for determining a plurality of areas such as two, three, four, five, or up to ten areas. The processing unit 114 may be configured for segmenting the light spot into at least two areas of the beam profile and/or to segment the beam profile in at least two segments comprising different areas of the beam profile. The processing unit 114 may be configured for determining for at least two of the areas an integral of the beam profile over the respective area. The processing unit may be configured for comparing at least two of the determined integrals. Specifically, the processing unit 114 may be configured for determining at least one first area and at least one second area of the beam profile. The area of the beam profile may be an arbitrary region of the beam profile at the position of the optical sensor used for determining the quotient Q. The first area of the beam profile and the second area of the beam profile may be one or both of adjacent or overlapping regions. The first area of the beam profile and the second area of the beam profile may be not congruent in area. For example, the processing unit 114 may be configured for dividing a sensor region of the CMOS sensor into at least two sub-regions, wherein the processing unit may be configured for dividing the sensor region of the CMOS sensor into at least one left part and at least one right part and/or at least one upper part and at least one lower part and/or at least one inner and at least one outer part. Additionally or alternatively, the camera 112 may comprise at least two optical sensors 126, wherein the light-sensitive areas of a first optical sensor 126 and of a second optical sensor 126 may be arranged such that the first optical sensor 126 is adapted to determine the first area of the beam profile of the reflection feature and that the second optical sensor 126 is adapted to determine the second area of the beam profile of the reflection feature. The processing unit 114 may be adapted to integrate the first area and the second area. The processing unit 114 may be configured for using at least one predetermined relationship between the quotient Q and the longitudinal coordinate for determining the longitudinal coordinate. The predetermined relationship may be one or more of an empiric relationship, a semi-empiric relationship and an analytically derived relationship. The processing unit 114 may comprise at least one data storage device for storing the predetermined relationship, such as a lookup list or a lookup table.

The 3D detection step may comprise determining the at least one depth level from the second beam profile information of said reflection features by using the processing unit.

The processing unit 114 may be configured for determining the depth map of at least parts of the scene by determining at least one depth information of the reflection features located inside the image region of the second image corresponding to the image region of the first image comprising the identified geometrical feature. The processing unit 114 may be configured for determining the depth information of the reflection features by one or more of the following techniques: depth-from-photon-ratio, structured light, beam profile analysis, time-of-flight, shape-from-motion, depth-from-focus, triangulation, depth-from-defocus, stereo sensors. The depth map may be a thinly filled depth map comprising a few entries. Alternatively, the depth may be crowded comprising a large amount of entries.

The detected face is characterized as 3D object if the depth level deviates from a pre-determined or pre-defined depth level of plane objects. Step c) 120 may comprise using 3D topology data of the face in front of the camera. The method may comprise determining a curvature from the at least four of the reflection features located inside the image region of the second image corresponding to the image region of the first image comprising the identified geometrical feature. The method may comprise comparing the curvature determined from the at least four of the reflection features to the pre-determined or pre-defined depth level of plane objects. If the curvature exceeds an assumed curvature of plane object the detected face may be characterized as 3D object, otherwise as plane object. The pre-determined or pre-defined depth level of plane objects may be stored in at least one data storage of the processing unit such as a lookup list or a lookup table. The pre-determined or pre-defined level of plane objects may be experimentally determined and/or may be a theoretical level of plane objects. The pre-determined or pre-defined depth level of plane objects may be at least one limit for at least one curvature and/or a range for at least one curvature.

3D features determined step c) 120 may allow differentiating between high quality photographs and a 3D face-like structure. The combination of steps b) 116 and c) 120 may allow strengthening reliability of the authentication with respect to attacks. 3D features can be combined with material features to increase the security level. Since the same computational pipeline can be used to generate the input data for the skin classification and the generation of the 3D point cloud, both properties can be calculated from the same frame with low computational effort.

Preferably subsequent to steps a) 110, b) 116 and c) 120 the authentication step 122 may be performed. The authentication step 122 may be performed partially after each of steps a) to c). The authentication may be aborted in case in step a) 110 no face is detected and/or in step b) 116 the reflection features is determined not to be generated by skin and/or in step c) 120 the depth map refers to a plane object. The authentication step comprises authenticating the detected face by using at least one authentication unit if in step b) 116 the detected face is characterized as skin and in step c) 122 the detected face is characterized as 3D object.

Steps a) to d) may be performed by using at least one device, for example the at least one mobile device 124 such as a mobile phone, smartphone and the like, wherein access of the device is secured by using face authentication. Other devices may be possible, too such as an access control device controlling access to buildings, machines, automobiles and the like. The method may comprise permitting access to the device if the detected face is authenticated.

The method may comprise at least one enrollment step. In the enrollment step a user of the device may be enrolled. The enrolling may comprise a process of registering and/or signing up and/or teach in of a user for subsequent usage of the device. Usually, enrolling may be performed at first use of the device and/or for initiating the device. However, embodiments are feasible in which a plurality of users may be enrolled, e.g. successively, such that the enrolling may be performed and/or repeated at an arbitrary time during usage of the device. The enrolling may comprise generating a user account and/or user profile. The enrolling may comprise entering and storing user data, in particular image data, via at least one user interface. Specifically, at least one 2D image of the user is stored in at least one database. The enrollment step may comprise imaging at least one image of the user, in particular a plurality of images. The images may be recorded from different direction and/or the user may change his orientation. Additionally, the enrollment step may comprise generating at least one 3D image and/or a depth map for the user which may be used in step d) for comparison. The database may a database of the device, e.g. of the processing unit 114, and/or may be an external database such as a cloud. The method comprises identifying the user by comparing the 2D image of the user with the first image. The method according to the present invention may allow significantly improving the presentation attack detection capabilities of biometric authentication methods. In order improve the overall authentication, person specific material fingerprints as well as 3D topological features may be stored during the enrollment process in addition to the 2D image of the user. This may allow a multifactor authentication within one device by using 2D, 3D and material-derived features.

The method according to the present invention using beam profile analysis technology may provide a concept to reliably detect human skin by analyzing reflections of laser spots, in particular in the NIR regime, on a face and distinguish it from reflections coming from attack materials that were produced to mimic a face. Additionally, beam profile analysis simultaneously provides depth information by analyzing the same camera frame. Therefore, 3D as well as skin security features may be provided by the exact same technology.

Since also the 2D image of the face can be recorded by simply switching off the laser illumination, a fully secure face recognition pipeline can be established solving the above-stated problem.

The reflection properties of human skin with respect to ethnic origin become more similar when the laser wavelength is shifted towards the NIR regime. At a wavelength of 940 nm differences are at a minimum. Accordingly, different ethnic origins do not play a role for skin authentication.

No time-consuming analysis of a series of frames may be necessary since presentation attack detection (via skin classification) is provided by just one frame. A time frame for performing the complete method may be 500 ms, preferably 250 ms. However, embodiments may be feasible in which the skin detection may be performed using a plurality of frames. Depending on confidence for identifying reflection features in the second image, and speed of the method, the method may comprise sampling reflection features over several frames in order to reach a more stable classification.

Figure 3:
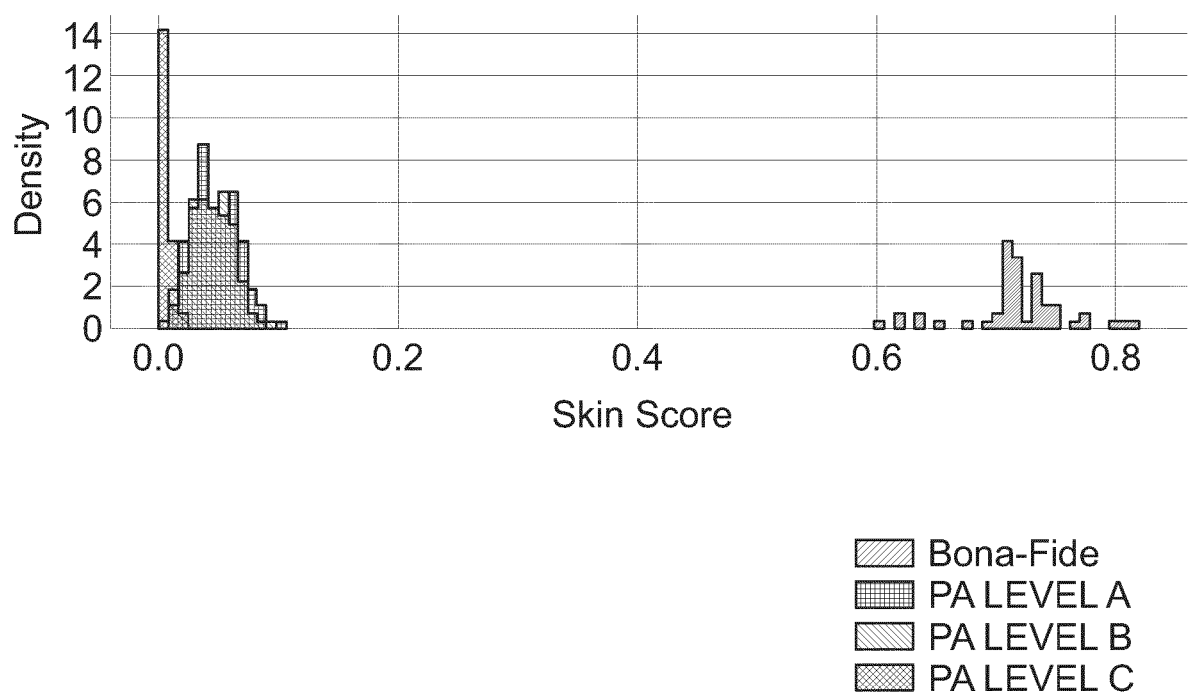
FIG. 3 shows experimental results.

FIG. 3 shows experimental results, in particular density as a function of skin score. On the x-axis the score is shown and on the y-axis the frequency. The score is a measure for the classification quality and has a value range between 0 and 1, wherein 1 indicates very high skin-similarity and 0 very low skin-similarity. A threshold for decision may be around 0.5. A reference distribution of skin-scores for bona fide presentations has been generated using 10 subjects. Skinscores have also been recorded for presentation attacks (PA) of Level A, Level B and Level C (as defined in the relevant ISO standards). The experimental setup (target of evaluation, ToE) included a proprietary hardware device, e.g. as described in FIG. 2, which includes the necessary sensors as well as the computational platform on which the PAD software is executed. The ToE was tested using six species of target of Level A PAIs (presentation attack instruments), five PAI species of Level B, and one PAI species of Level C. For each PAI species, 10 PAIs have been used. The PAI species used in this study are listed in the table below. In the table, APCER is the Attack Presentation Classification Error Rate, which refers to the number of successful attacks/all attacks*100. In the table, BPCER is the Bona Fide Presentation Classification Error Rate, which refers to the number of rejected unlock-attempts/all unlock-attempts*100 Level A and Level B attacks are all based on 2D PAIs, whereas for Level C attacks, based on 3D masks. For Level C attacks, custom rigid masks constructed using a 3D printer were used. A test crew of 10 subjects has been used to obtain the reference distribution of skin-scores for bona fide presentations.

| Level | #PAI species | PAI species | #objects | #presentations | Results |
|---|---|---|---|---|---|
| A | 6 | 4 printed, 2 digital replay (normal quality) | 60 | 300 (60 × 5) | APCER = 0% |
| B | 5 | 4 printed, 1 digital replay (optimized for spoof) | 50 | 250 (50 × 5) | APCER = 0% |
| C | 1 | 3D printed mask | 10 | 50 (10 × 5) | APCER = 0% |
| Bona Fide | — | — | 10 | 50 (10 × 5) | BPCER = 0% |

The experiments with these PAIs show that the two classes of presentations (bona fide or PA) are clearly distinguishable based on the skin-score. Clear distinction between paper, 3D print and skin is possible using the method according to the present invention.

LIST OF REFERENCE NUMBERS 110 face detection step
112 camera
114 processing unit
116 skin detection step
118 illumination unit
120 3D detection step
122 authentication step
124 mobile device
126 optical sensor

The invention claimed is:

1. A method for face authentication comprising the following steps:
   a) at least one face detection step, wherein the face detection step comprises determining at least one first image by using at least one camera, wherein the first image comprises at least one two-dimensional image of a scene suspected to comprise the face, wherein the face detection step comprises detecting the face in the first image by identifying in the first image at least one pre-defined or pre-determined geometrical feature characteristic for faces by using at least one processing unit;
   b) at least one skin detection step, wherein the skin detection step comprises projecting at least one illumination pattern comprising a plurality of illumination features on the scene by using at least one illumination unit and determining at least one second image using the at least one camera, wherein the second image comprises a plurality of reflection features generated by the scene in response to illumination by the illumination features, wherein each of the reflection features comprises at least one beam profile, wherein the skin detection step comprises determining a first beam profile information of at least one of the reflection features located inside an image region of the second image corresponding to an image region of the first image comprising the identified geometrical feature by analysis of its beam profile and determining at least one material property of the reflection feature from the first beam profile information by using the processing unit, wherein the detected face is characterized as skin if the material property corresponds to at least one property characteristic for skin;

c) at least one 3D detection step, wherein the 3D detection step comprises determining a second beam profile information of at least four of the reflection features located inside the image region of the second image corresponding to the image region of the first image comprising the identified geometrical feature by analysis of their beam profiles and determining at least one depth level from the second beam profile information of said reflection features by using the processing unit, wherein the detected face is characterized as 3D object if the depth level deviates from a pre-determined or pre-defined depth level of plane objects; and d) at least one authentication step, wherein the authentication step comprises authenticating the detected face by using at least one authentication unit if in step b) the detected face is characterized as skin and in step c) the detected face is characterized as 3D object.

2. The method according to claim 1, wherein steps a) to d) are performed by using at least one device, wherein access of the device is secured by using face authentication, wherein the method comprises permitting access to the device if the detected face is authenticated.

3. The method according claim 2, wherein the method comprises at least one enrollment step, wherein in the enrollment step a user of the device is enrolled, wherein at least one 2D image of the user is stored in at least one database, wherein the method comprises identifying the user by comparing the 2D image of the user with the first image.

4. The method according to claim 1, wherein in the skin detection step at least one parametrized skin classification model is used, wherein the parametrized skin classification model is configured for classifying skin and other materials by using the second image as an input.

5. The method according to claim 4, wherein the skin classification model is parametrized by using machine learning, wherein the property characteristic for skin is determined by applying an optimization algorithm in terms of at least one optimization target on the skin classification model.

6. The method according to claim 4, wherein the skin detection step comprises using at least one 2D face and facial landmark detection algorithm configured for providing at least two locations of characteristic points of a human face, wherein in the skin detection step at least one region specific parametrized skin classification model is used.

7. The method according to claim 1, wherein the illumination pattern comprises a periodic grid of laser spots.

8. The method according to claim 1, wherein the illumination features have wavelengths in a near infrared (NIR) regime.

9. The method according to claim 8, wherein the illumination features have wavelengths of 940 nm.

10. The method according to claim 1, wherein a plurality of second images is determined, wherein the reflection features of the plurality of second images are used for skin detection in step b) and/or for 3D detection in step c).

11. The method according to claim 1, wherein the camera comprises at least one near infrared camera.

12. A non-transitory computer-readable medium storing a computer program for face authentication configured for causing a computer or a computer network to fully or partially perform the method according to claim 1, when executed on the computer or the computer network, wherein the computer program is configured for performing and/or executing at least steps a) to d).

13. A non-transitory computer-readable medium storing a computer program comprising instructions which, when executed by a computer or computer network, cause to carry out at least steps a) to d) of the method according to claim 1.

14. A non-transient computer-readable medium comprising instructions that, when executed by one or more processors, cause the one or more processors to perform at least steps a) to d) of the method according to claim 1.

15. A mobile device comprising at least one camera, at least one illumination unit, and at least one processing unit, the mobile device being configured for performing at least steps a) to c), and optionally step d), of the method for face authentication according to claim 1.

16. A method of using the method for face authentication-according to claim 1, wherein the method comprising using the method for face authentication for biometric presentation attack detection.

* * * * *